United States Patent [19]

Matthews

[11] Patent Number: 5,374,151

[45] Date of Patent: Dec. 20, 1994

[54] TRANSPORT LOADING SYSTEM

[76] Inventor: Robin Matthews, 15 Hamilton Lane, Great Brington, Northamptonshire, NN7 4JJ, Great Britain

[21] Appl. No.: 728,670

[22] Filed: Jul. 12, 1991

[30] Foreign Application Priority Data

Jul. 14, 1990 [GB] United Kingdom ............. 9015557.3

[51] Int. Cl.⁵ ...................... B65G 67/04; B65G 67/24
[52] U.S. Cl. .................................. 414/392; 414/399; 414/343
[58] Field of Search ............... 414/390, 391, 392, 393, 414/395, 398, 399, 400, 608, 343

[56] References Cited

U.S. PATENT DOCUMENTS

| Re. 31,060 | 10/1992 | Lutz | 414/400 X |
| 2,828,027 | 3/1958 | Stevenson et al. | 414/392 X |
| 3,186,566 | 6/1965 | Spinager et al. | 414/400 X |
| 3,437,219 | 4/1969 | Stevenson | 414/391 |
| 3,727,777 | 4/1973 | Hanson | 414/400 |
| 3,952,887 | 4/1976 | Lutz | 414/392 |
| 4,832,559 | 5/1989 | Gebbardt | 414/392 |
| 4,844,681 | 7/1989 | Pierre et al. | 414/398 |
| 4,941,794 | 7/1990 | Hara et al. | 414/391 X |
| 5,054,987 | 10/1991 | Thornton | 414/390 |
| 5,082,415 | 1/1992 | Hayashi | 414/399 X |

FOREIGN PATENT DOCUMENTS

| 2706986 | 8/1978 | Germany | 414/392 |
| 2747249 | 4/1979 | Germany | 414/393 |
| 2936160 | 4/1981 | Germany | 414/398 |
| 3533784 | 9/1985 | Germany | 414/390 |
| 0275930 | 11/1987 | Japan | 414/400 |
| 1411243 | 7/1988 | U.S.S.R. | 414/400 |

Primary Examiner—Michael S. Huppert
Assistant Examiner—Stephen Gordon
Attorney, Agent, or Firm—Lackenbach Siegel Marzullo Aronson & Greenspan

[57] ABSTRACT

A mobile retractable load deck (12) comprises a platform with a ground running bearing surface (24), for releasably elevating and supporting a load 16 resting thereupon from a support surface (19) at a load collection station and transferring that elevated load to a delivery station (42), where the load deck is retracted to deposit the load and then withdrawn therefrom.

13 Claims, 20 Drawing Sheets

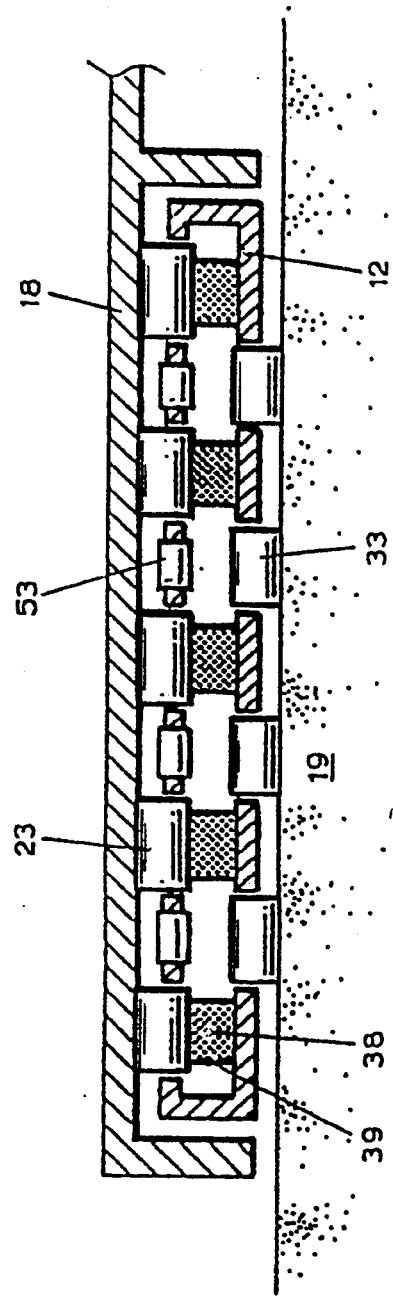
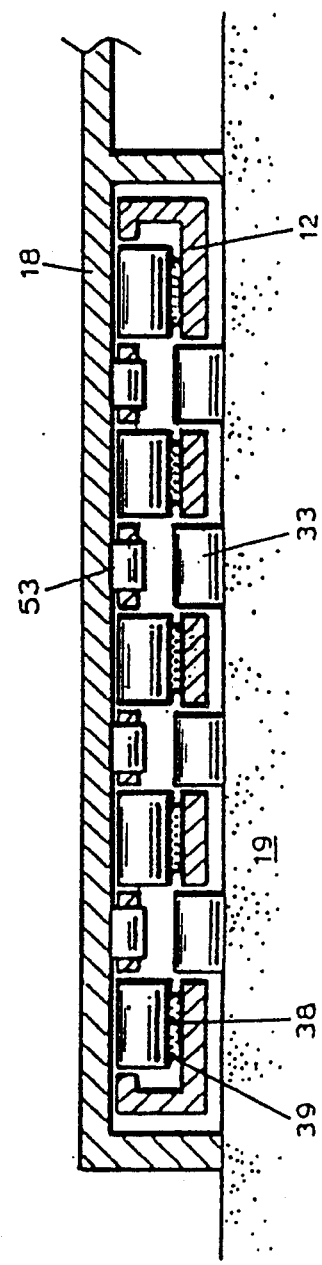
FIG. 4A
FIG. 4B

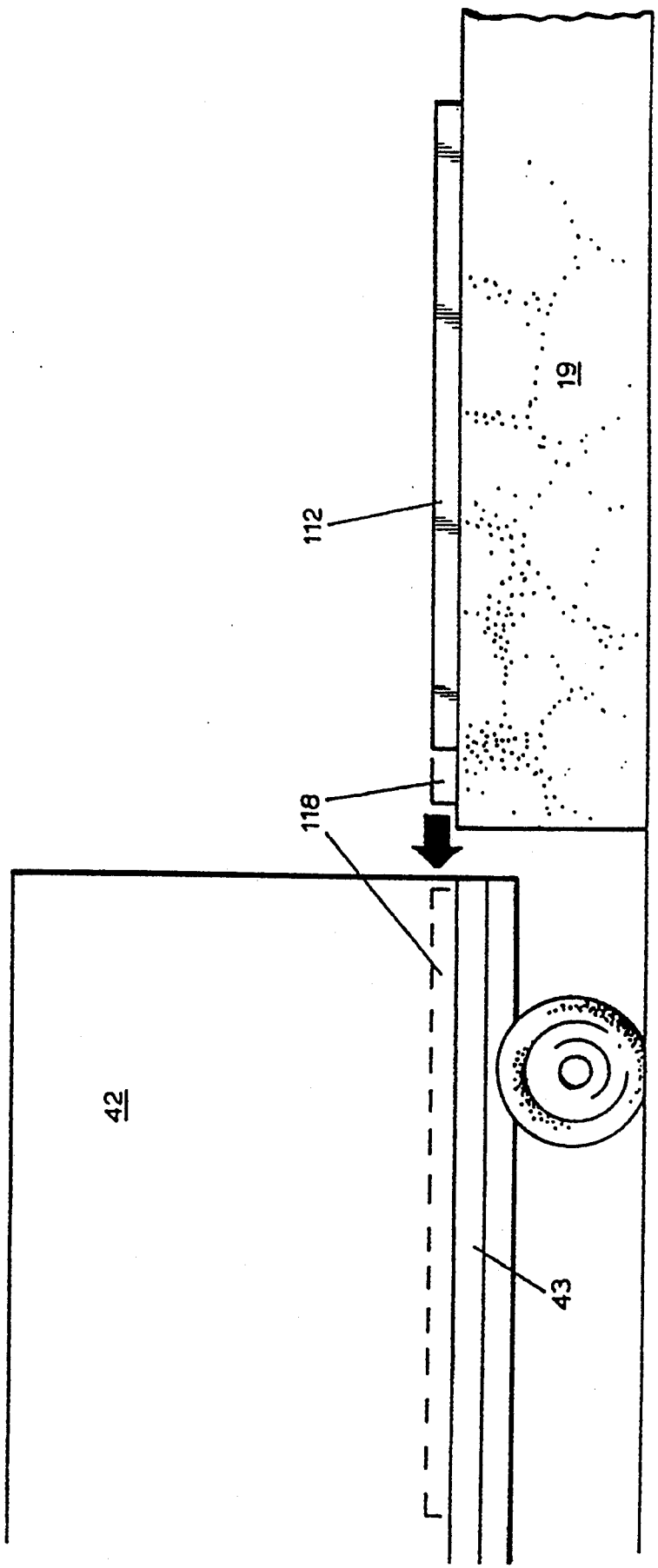

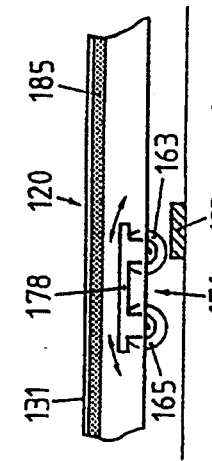
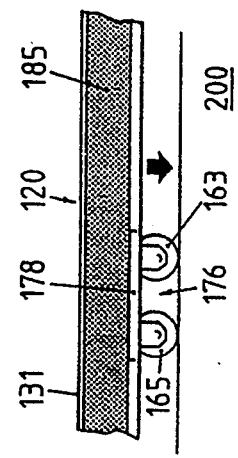
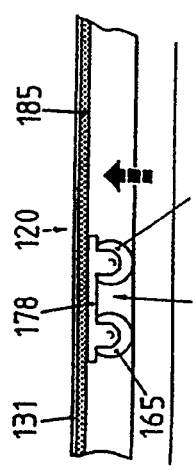
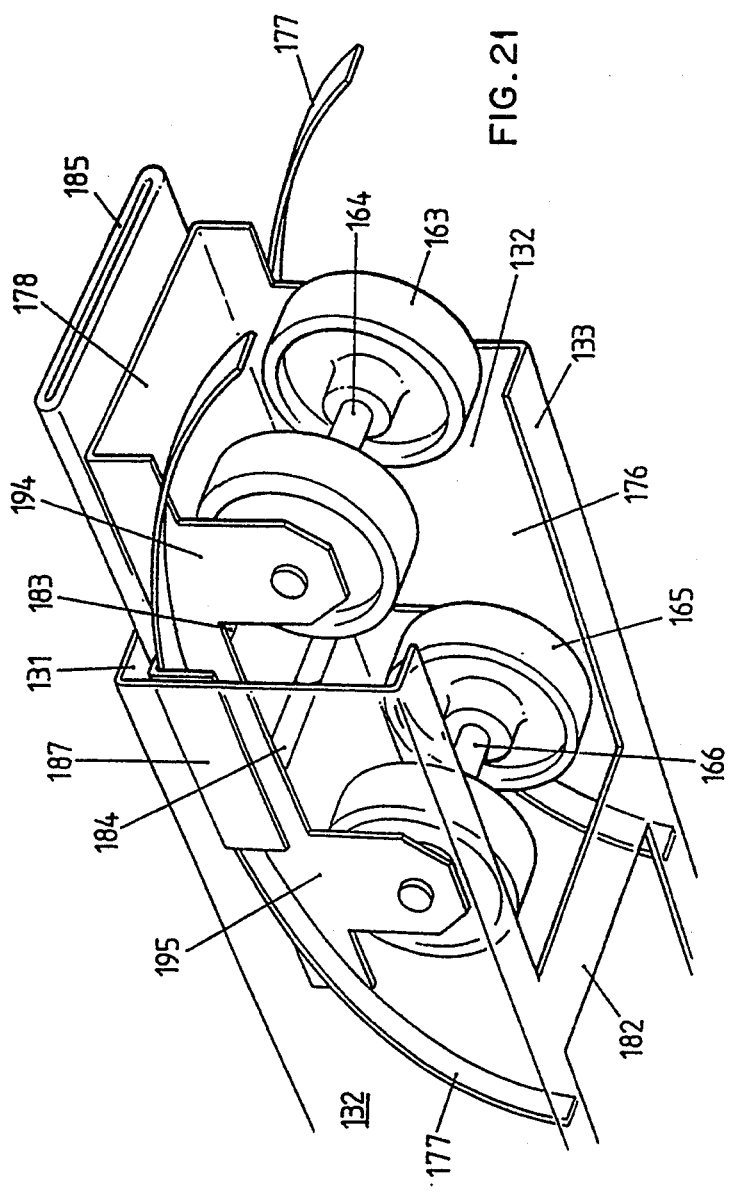

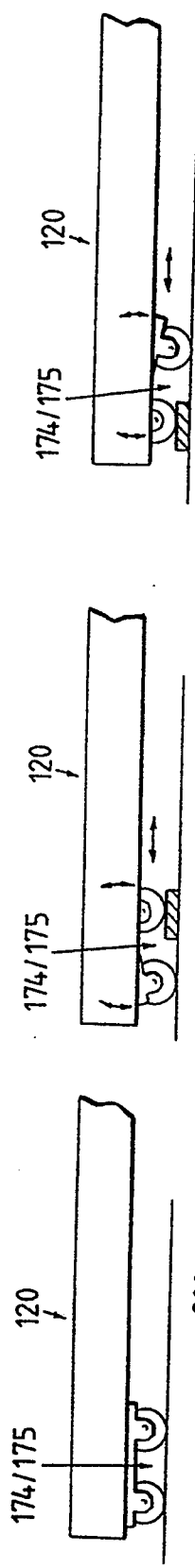

TRANSPORT LOADING SYSTEM

BACKGROUND OF THE INVENTION

1. Field of the Invention

This invention relates to material(s) handling and is particularly, but not exclusively, concerned with the unitary or 'one-shot' handling of relatively large, bulky, cumbersome or multi-component loads as a single entity.

2. Description of the Prior Art

Unitary handling is an advantage when loading and unloading turn-around times are critical.

The term 'load' embraces any kind or form of material, whether single or multiple items, packaged or loose—without particular restriction upon overall volume, configuration or weight.

Similarly, the term 'handling' embraces any action or treatment which it is desired to apply to a load, or constituent parts of the load—and indeed the very initial load formation and subsequent load dissolution or dismantling.

In most instances such handling will imply some mobilization, i.e. enabling movement, and including subsequent (typically linear translational) movement itself.

Either to facilitate handling, or as part of load positioning, some, albeit marginal, elevation of the load is also commonplace—e.g. simply to raise the load clear of a (ground) support surface.

Loads may be prepared ready for handling by virtue of their 'packaging profile', including a pre-assembled stack of individual component subsidiary loads, but the stack, whilst representing in its entirety the overall load to be treated or handled as a whole, may not itself have the inherent robust nature or integrity to facilitate such handling as a single entity.

For example, the load may be loose stacked cartons.

The invention is concerned in some (but not necessarily all) of its aspects with the handling of a load in its entirety, including the transfer of a previously assembled (multi-component) load into a pre-defined load space, such as a (vehicle) container, which is either unmodified or has minimal modifications or adaptations to receive the load.

Such transfer in a single continuous operation is also embraced.

An example would be the loading or unloading of an entire (e.g. containerised) vehicle load in a single operation.

A remote (i.e. not an integral part of the vehicle) loading or unloading facility for such 'single-phase' operation is desirable, for use with different vehicles.

Essentially, load handling is a 'temporary' special case of materials handling, i.e. a 'given' or prescribed amount of material to be handled at a given time, on a given occasion, or over a given time span; and generally a case where external restrictions or limitations in mechanical practicalities associated with the nature of the load itself, are placed upon the volume, configuration or weight of the material to be handled at any such one time.

In that regard, material may be produced in a form which suits, or is a compromise between the requirements of the producer, along with any interim stockists and ultimate consumer, for the intended market, but may not be particularly suited to the available external carriage or transport facilities, which are generally outside the control of the producer.

Thus the consumer may require only a single goods unit at one time, whereas manufacturing economies of scale and storage dictate a minimum multiple unit number, and on occasion an intermediate breakdown therebetween being the responsibility of a wholesaler and possibly retailer chain.

However the external transport industry may pay no direct attention to any of these considerations.

Whilst the transport industry has sought to standardize loads for efficient handling through different transport media, i.e. road, rail, sea and air—in particular by adopting standard available load capacity through containerization, some load characteristics do not lend themselves readily to containerisation or in particular the loading into containers. Thus the potential economies of scale of bulk load transport are difficult to realise.

A 'container' has prescribed shape and volume upon a given base floor area, along with a maximum loaded weight, and may be physically enclosed with side and end walls and a roof, or some of these may be omitted, with a limiting case of a simple load platform with some tie down and stacking points.

Enclosed containers pose particular loading constraints, since loading from above is precluded by the container roof and apart from curtain-sided variants loading is generally restricted to one narrow end.

For example, at one end of the scale, bulk individual loads such as steel girders have hitherto not readily been containerised, not least because of the impracticality hitherto of loading the attendant distributed weight from one end—i.e. the load centre of gravity is difficult to approach with conventional loaders.

At another extremity, small unit loads, such as cans of foodstuffs or drink may have to undergo several successive packaging steps, e.g. cartons or crates, stacked upon pallets and shrink wrapped for stability, to fill a container—i.e. they cannot economically be loaded individually, and even when grossed into larger multiple units, these are still much less than an individual container capacity.

In this latter case, no practical means has hitherto been identified for loading a container, in a 'single-shot' operation, with a full complement of multiple cans—i.e. several hundred or even several thousand, cans at one time.

Both these load examples are characteristically static, or with no inherent mobility, whether in the packaging or otherwise.

Introducing such mobility through the medium of the load handler has an associated penalty in 'handling space'.

A container has predetermined associated handling costs, regardless of its actual contents, i.e.(subject to special commercial tariff arrangements) an empty container costs as much to handle and transport as a full container.

Thus a container generally represents a bulk load capacity to be filled as completely as possible, by a typically multi-component or fragmented load, minimizing wasted voids and within the prescribed weight limitations—and also without undue packaging, which represents a load 'denial' (or wasted additional load opportunity) and an unproductive associated expense overhead.

This represents so-called 'volumetric efficiency'.

Without being unduly theoretical, the load handling problem may thus be analysed in relation to three main components, namely:

I. the (physical) space (i.e. floor area and overall volume) occupied load itself (to be handled);

II. the (theoretically ultimate) available load space or capacity; and

III. the (physical and notional supplementary maneuvering, load mounting and dismounting) handling space required by the load handling facility.

For efficient load handling, (i.e. maximizing the use of the available load capacity) the difference between available load space or capacity II and the load I must be minimized; i.e. minimal unused or wasted load space—whether, say, (in the case of containerized handling) by virtue of peripheral/ancillary load packaging or 'awkwardness', or incompatibility of the load shape in relation to a container interior.

However, the handling space III must also be compatible with the available load capacity II—i.e. the handling facility must be able to fit physically, at least in part into that capacity, in order to introduce and withdraw the load in relation thereto.

In addition, the load handling space must align closely with the minimized difference between I and II—i.e. with minimal wasted load capacity, the load handling must still be able to operate, from start to end of the loading sequence.

It will be appreciated that, as the available load space starts to fill, there is progressively less intrusion of the load handling which can be accommodated, although in principle there may be an attendant reduction in the need for such intrusion, as the load is introduced along one loading direction or axis.

In a practical sense, for container loading, the handling device may have to fit within the container. Not least because of the inherent fragmented nature of many, if not most, container loads—i.e. the container load capacity is many times an individual load component—it is commonplace to introduce the load components individually, as what will hereinafter be referred to for convenience as multiple 'subsidiary' loads.

For fragmented or multi-component loads, two known broad categories of load handling device are:

A. Trucks or trolleys; and

B. Conveyors

Trucks or trolleys are typified by independently-mobile fork-lift trucks and pallet trolleys—usually restricted to a single, or a relatively few component (e.g. palletized) loads, at least in relation to an overall container capacity.

Moreover, these are essentially, 'discrete' or one-off/one-at-a-time loaders.

European Patent Application No. 0 133 042 teaches an elevatable track-running, load handling trolley variant.

Conveyors, whether roller beds or continuous belts are, in contrast, 'continuous' loaders, but generally restricted to one location, or, if mobile, are inherently unwieldy, by virtue of their long and narrow configuration.

European Patent Application No. 0 000 321 teaches an elevatable mobile roller conveyor variant.

Both of these handling device categories have been adapted for containerized loads, with a uniform overall load profile, which facilitates subsequent storage and handling—i.e. a larger stack of containers can be formed and vehicles and load handling equipment, such as cranes and side-loader lifts, may have standardized fittings to receive such containers.

Such uniformity may be extended within the container, by adopting subsidiary component loads themselves also of a (lesser) uniform profile, by palletization or even 'miniature' containers.

Palletized loads are generally stackable, so that any irregularity of the individual load items does not undermine the regularity of the overall load profile—although there may necessarily be voids within the container.

Indeed, any vehicle with a predefined load space and load volume imposes corresponding constraints upon the nature of its load capacity—i.e. in short, the load must be tailored to fit the vehicle/container.

If the load can be broken down into relatively small and regularly shaped components. then—given enough time, skill and patience, and some discretion in load component selection—virtually the entire load space can be filled, at least manually.

In that regard, it is also known to automate the formation of an individual (palletized) load stack, e.g. from a collection of cartons of individually known configuration, fed to by a conveyor, from a continuous production source or an intermediate stockpile, to a palletized load formation station, where they are deposited in succession upon a palletized floor until a stack of desired proportions and weight has been formed.

These cartons may be coded, e.g. by bar coding, to reveal their identity to a selection and loading mechanism.

Thereafter the thus palletized load may be 'integrated' or formed into a unitary collection, e.g. by shrink wrapping, to give the palletized load stability in subsequent handling.

Thus, for example, in the canned soft drinks field, it is known both to shrink wrap a tray of cans and a stack of palletized wrapped cans, to enable secure handling by a fork lift truck.

However, such palletized load automation has hitherto generally been restricted to a relatively small individual pallet and not the formation of an entire vehicle container load from a succession of pallets.

Palletized loads lend themselves to handling by conventional relatively small-scale, general purpose un-/loading vehicles, such as fork lift trucks, which can readily be used to fill long vehicle open-sided containers or decks from the exposed accessible vehicle (longitudinal) sides, side cover sheets, doors or shutters then being closed to conceal and protect the load or the load covered overall by a tarpaulin and roped or strapped in position.

For containers accessible only at one end, fork lift trucks may be used only to introduce the load at that end, with subsequent movement being effected manually, albeit with the assistance of bearing surfaces on the vehicle floor or individual pallet trucks.

However, this may not be practicable for the generality of loads which might have to be carried and thus wasted voids arise in the load capacity.

In the materials handling industry it is common-place to employ pallets as an intermediary between the load and a load support.

The term pallet is used herein generally to embrace any form of platform or other ancillary load support, including load suspensions or side braces, upon which a load may be rested or otherwise mounted for subsequent storage and transit.

Conventional pallets, as an underside or platform floor, are typically of a spaced timber planking lattice construction, in order to support a load for storage and transit.

The pallet provides a ready means of grasping the load and bearing its weight, for example by using the support arms/tines/prongs of a fork lift truck to locate through the pallet depth.

To facilitate this the pallet has either a twin opposed reversible slatted deck surface with spaced intervening bearers, or a single deck with support ribs.

However, there has hitherto been a practical limit to the size, and in particular surface area, of pallet employed as such an ancillary support, because of the inherent strength and bulk requirements of the pallet, which add to the overall bulk of the storage mass and otherwise intrude into the available load storage space/volume.

As such, a conventional pallet construction large enough to cover the entire available load area of a vehicle, whether containerized, box body or open flat deck has not been feasible. In particular, the bending loads on the pallet would be excessive.

Even if such a pallet could be constructed, there is presently no facility for lifting and moving it as a whole, let alone inserting it into a vehicle body and withdrawing the load mechanism.

Again the bending moments for a load of such overall length and weight, necessarily supported only from a remote end, would be burdensome and difficult to engineer.

Thus, it is common practice to form a composite bulk load larger than an individual pallet capacity from an assembly of several (say, longitudinally) aligned individually palletized subsidiary loads.

Handling pallets one-at-a-time, is laborious and time consuming—but handling several pallets securely at one time is problematical.

One approach that has been adopted to facilitate the formation of bulk loads from fragmented components is a combined conveyor and load support platform.

For example, a vehicle container load deck may have integral bearing surface incorporating rollers spaced over the load deck for moving parts of the load around the deck, with means to lock or withdraw those rollers into an inoperative (non-load contacting) condition.

UK Patent No. 2,126,189 teaches one such a 'bespoke' roller deck, for integration with a vehicle or container floor.

A similar roller load deck may be used at the un/loading station for the assembled load ready for un/loading.

The individual load components can then be rolled, either singly or as a group, from the assembled stack on to the (vehicle) container.

As the initial load reaches the end of the container, it is brought to a halt, with a slipping drive contact thereafter as successive loads accumulate progressively.

More elaborate such roller decks also incorporate a drive mechanism, such as a friction-grip slipping chain or belt, so that the deck combines the functions of a conveyor.

Thus continuous runs of power driven decks may be used to transport loads, typically palletized so that a pallet may engage the drive mechanism, over long runs.

However, such a specialized load deck represents an elaborate and expensive solution, which is only economically justifiable when the loading and unloading cycle time is significant in relation to the vehicle average journey time—i.e. relatively short delivery runs, of, say, 10 miles or less.

It would thus be advantageous to be able to form the entire vehicle load, even for say a full sized container to international standards (for the UK generally up to 40 ton weight in a 12 m×2.5 m×2.5 m volume), and transport it directly in a single loading operation into the container, without requiring a specialized container load deck.

The length of this load deck, typically of the order of some 40 feet, is a critical factor in loading from one of the narrow ends.

That is to reach inside the 40 feet carrying a load on a mechanism which does not unduly infringe upon the load volume capacity and to deposit that load and retract is a major engineering feat with conventional approaches—the functional equivalent being the deployment of say a fork lift truck with a 40 foot arm reach.

In some applications such a full load could advantageously be made up of standard pallets, typically 1000 mm×1200 mm in surface area, but handling a fully palletized load at one time (rather than in successive 'bites' or steps) has not hitherto proved feasible.

Although the foregoing discussion has centered upon container loading, and in particular palletized component subsidiary loads, the principles apply to any materials handling situation in which a load must be formed at a remote point from the source of load materials.

Thus warehousing situations are embraced where there is a requirement for lone-term load storage, and internal load re-location, e.g. before transfer to a loading station, ready for a vehicle container.

SUMMARY OF THE INVENTION

According to one aspect of the invention there is provided a load handler capable of handling a load in a confined available load space and requiring a load handling space which is in close proximity to and conformity with the space occupied by the load and which is small in relation to both the load and the available load space and comprising a withdrawable load support engageable with the load over sufficient of its entire physical extent for it to be supported and handled as a unitary integrated whole load entity however the load is composed and with a stable distributed weight whereby the load may be mobilized from one location to another with minimal intrusion into the available load space and yet the load support can still be withdrawn when the available load space is completely filled.

Preferably, the load handler incorporates a support surface contact bearing runner, which when shared with the load imparts mobility to the load.

Conveniently, the load handler incorporates a load elevating and lowering facility, so that the load can be raised, albeit marginally, clear of a support surface to facilitate load mobility—i.e. to reduce the contact frictional drag with attendant potential for load and support surface scuffing damage.

According to another aspect of the invention there is provided a load handler for a load which is accumulated from a plurality of discrete subsidiary component loads, each mountable upon a pallet, incorporating a removable load support carriage engageable with individual subsidiary, loads, a composite load elevating and lowering facility for a plurality of subsidiary loads at one time, and a surface contact bearing, enabling the load to be lifted, mobilized and carried from one location and deposited at another location, as a unitary entity, over a support surface.

In a practical construction, the load handler comprises a mobile support platform, with rolling or sliding surface contact runners or skids, the support platform being elevatable to lift a load, if necessary in its entirety, once engaged and retractable to lower the load back onto a support enabling the load platform to be withdrawn, in the retracted condition of the load handler.

When the load is engaged and supported from underneath, the retracted condition of the load handler facilitates introduction underneath the load, whilst minimising intrusion into the height of the available load space.

Conveniently, the load support platform incorporates a series of rolling contact members, such as rollers or wheels (or alternatively a continuous track-laying vehicle may be employed), disposed on suspended bogies and at least some of which may be retracted under the platform to minimize the local load height, and extended in order to raise the load clear of a support surface, to enable their mobility to be imparted to the load.

An inflatable fluid-filled, e.g. air, bag may be used to raise and lower such rollers or wheels.

According to a further aspect of the invention there is provided a containerized loading and unloading assembly comprising a retractable loading deck for a containerizable load, capable of releasably engaging, elevating and supporting an entire container load remote from a container, as a unitary entity and introducing that entire load in a continuous loading action from entirely externally of a container through one open end thereof to completely fill the container capacity, and without unduly reducing the overall container load capacity, and subsequently retractable to leave the entire load resting upon the container floor and disengageable from the lowered load, to enable its withdrawal entirely from the container.

Unloading is generally the reverse of loading, so the expression 'un/loading' embraces the corresponding loading and reversed unloading functions, whether of the whole load or some (selected lesser) part thereof.

Thus, whilst full load handling capability may be provided, it may deliberately be used to less than its ultimate capacity to deal with only part of a load.

The term 'retractable' embraces a diversity of mechanisms for disengaging the deck from the load temporarily carried thereby, once un/loading has been undertaken.

Similarly, the term 'deck' embraces any mechanical construction capable of load support from any orientation, i.e. not just a (flat/even/level) platfrom from below—although this remains a mechanically/structurally convenient version.

Such a loading assembly would in principle be capable of loading an entire full sized container in a single operation from one (smaller) end alone, with the loading deck subsequently withdrawn for re-use on another subsequent container loading operation.

Thus a minimum of only one such retractable loading deck according to the invention would be required at each un/loading station—although, of course, additional such decks could be provided at each loading bay to increase overall un/loading capacity of the station.

As a preliminary step, the entire such containerized load may be assembled upon a master pallet of a load surface area equivalent to the entire vehicle container load space.

Moreover, upon that master pallet the assembled load may be formed upon multiple adjacent individual subsidiary pallets.

Thus the invention enables a single such retractable loading floor to be retained at the loading and unloading stations to be used for different loads.

This dispenses with the need for a specially adapted loading floor for each individual vehicle or load container or deck.

In a particular construction, such a loading floor comprises an elongate deck with dual spaced/opposed support and bearing surfaces.

These bearing surfaces may take a diversity of forms, including elements of the known retractable or lockable roller bearing platforms—such as the proprietary so-called HYDRAROLL, ROLAMAT or ROLALOAD (Trade Marks) systems. U.S. Pat. No. 4,089,399 teaches one such system.

Alternatively, the master pallet may comprise a relatively thin and flexible sheet 'bearing surface', which can simply be slid from underneath the bulk load assembly once the transfer between collection and delivery stations has been undertaken and then, say, rolled up compactly.

In some situations the master pallet itself may be dispensed with, in favour of a loading table configured, e.g. with multiple limbs, to pass between the pallet 'legs', so that the limbs may be inserted, the pallets then lifted, transported and deposited and the limbs withdrawn in the manner of fork lift arms, but with at least underside bearing surfaces to engage and run freely over the vehicle floor upon disengaging the undersides of the pallets.

It is indeed conceivable that even the subsidiary pallets might be dispensed with in certain special circumstances, e.g. with relatively light weight, bulky or low density loads which could be integrated en masse by say shrink wrapping.

According to yet another aspect of the invention there is provided a loading and unloading method comprising the steps of:

accumulating multiple individual subsidiary loads into an assembly corresponding cumulatively to a grosser load capacity;

capturing the loads as a unitary grosser load;

elevating the unitary load;

transporting the unitary load to another spaced location;

lowering and depositing the unitary load at that other location; disengaging and withdrawing the transporter from the load.

Some (docking) alignment and locking facility may be desirable in practice to bring the vehicle container load deck into the necessary close proximity to the retractable load deck at the load station.

However, the retractable load deck could be built upon a mobile self-powered, steerable platform, i.e. it could become a (load cart/trolley) vehicle in its own right.

Such a cart would lend itself to remote (e.g. radio) control as a slave or drone.

The necessary power source(s) and drive mechanisms may be any of a variety of diverse kinds, singly or in combination, including electrical, mechanical (including internal combustion engines), pneumatic (air or other gas), or hydraulic (fluid).

BRIEF DESCRIPTION OF THE DRAWINGS

There now follows a description of some particular embodiments of the invention, by way of example only, with reference to the accompanying diagrammatic and schematic drawings, in which:

FIGS. 4A and 4B show the use of retractable/lockable roller bearing surfaces for the loading arrangement of FIG. 2;

FIGS. 9A and 9B show a side elevation of the loading deck of FIG. 8 in operation;

FIG. 21 shows an underside view of an intermediate wheeled lifting set or suspended bogie for the load finger of FIGS. 19 and 20;

FIGS. 22A through 22C show a sequence of extension and retraction of the load finger wheel bogie set of FIG. 21, and when surmounting a ground obstacle.

FIG. 23 shows an underside view of an end bogie incorporating a jockey wheel suspension, corresponding to that of FIG. 21;

FIGS. 24A through 24C show a corresponding sequence of suspension movement of the end bogie set of FIG. 23 when surmounting a ground obstacle.

DESCRIPTION OF THE PREFERRED EMBODIMENTS

Figure 1:
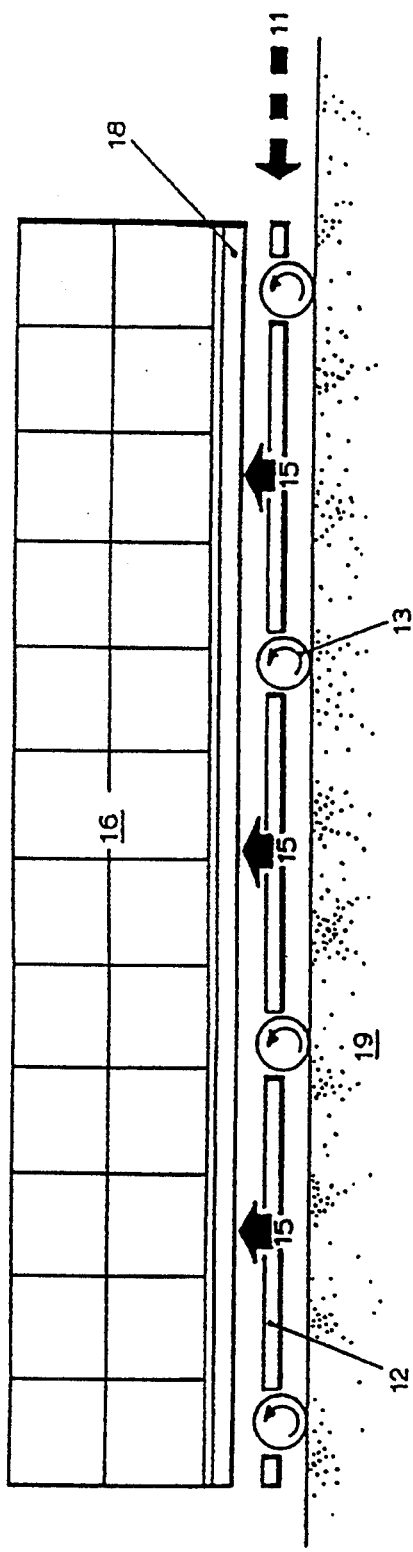
FIG. 1 depicts the general loading principle.
Figure 2:
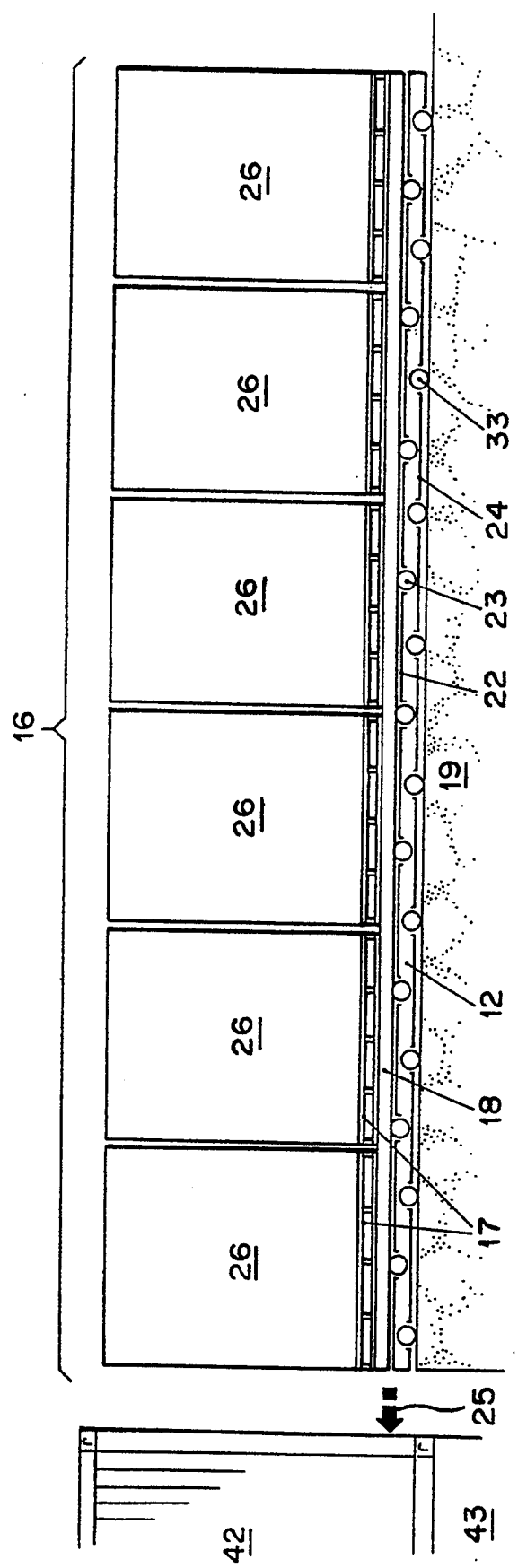
FIG. 2 shows loading principle of FIG. 1 applied to a retractable deck together with a master pallet.

Referring to the drawings, and in particular FIG. 1, a load 16, of otherwise indeterminate profile, but which might be comprised of individual subsidiary palletized component items, (as shown in FIG. 2) rests upon an optional master pallet 18. The latter is disposed upon a retractable load deck 12, itself mounted upon a generally flat support (platform) surface 19 at an un/loading (collection, parking or distribution) station.

Figure 7:
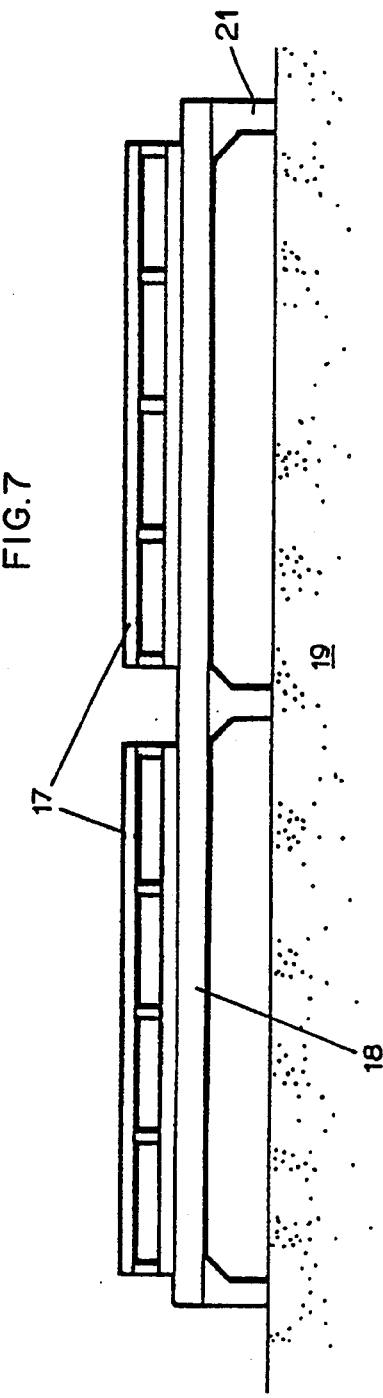
FIG. 7 shows in more detail a master pallet as used in the FIG. 2 arrangement, with a series of subsidiary pallets.

In this configuration, particularly with a palletized load and/or a master pallet 18 the load 16 may rest, ready for handling, directly upon the support surface 19 through the contact therewith of the pallet legs or underside support ribs 21 (see particularly FIG. 7).

The load deck 12 may then simply sit upon the support surface 19 marginally clear of, or 'tentatively engaging', the underside of the (palletized) load 16 or the master pallet 18, if present.

The master pallet 18 may thus perform a valuable ancillary unifying or consolidating function for the overall load 16 in relation to the load deck.

The load deck 12 is itself capable, through intervening rotational bearing runners generally indicated at 13, of (at least linear translational) movement over and in directions generally parallel to the support surface 19, as indicated by arrow 11 (FIG. 1).

Thus, the load deck 12, with the load 16 supported thereupon in its entirety, can be moved from over the load (collection) station support surface 19 to another location altogether—such as into a vehicle container 42 (as shown in FIG. 2), if the container deck 43 is at approximately the same level.

In some situations, a load deck 12 may be introduced into an empty vehicle container 42 and the load 16 slid thereupon, for example by an aligned ancillary load deck of a similar kind.

The overall depth of the load deck 12 is kept to a minimum, so that the overall load height, and thus vehicle container load capacity, is not unduly diminished.

The load deck 12, or at least its upper surface, may be elevated or extended, as indicated by arrows 15, in an upright direction transverse thereto, in order to engage the underside of the (palletized) load 16 and lift it clear of the support surface 19, to allow corresponding (e.g. linear translational) movement of the load 16 as a unitary whole.

That is to say, there is no need to break down the load 16 into its component parts, in order to move it from one place to another—and thus if the delivery place is within a vehicle container 42 itself, as described later, the entire load 16 can be carried from outside to within the container in a single movement operation.

FIG. 2 shows in more detail the construction of a retractable load deck in which an (optional supplementary) upper (bearing) surface 22 thereof incorporates retractable and/or lockable (i.e. to inhibit rotation thereof) upper bearing rollers 23, spaced uniformly across the area thereof, in order to provide a continuous 'mobile' bearing surface 22 for the load 16, thereby enabling movement of the load 16 as a whole in relation to the load deck—thus facilitating its retraction from underneath the load 16. as described later.

A corresponding retractable and/or lockable lower bearing surface 24 is provided on the underside of the load deck 12, by means of spaced lower rollers 33, to promote the movement of the load deck 12 as a whole over the support surface 19, while carrying the entire burden of the overall unitary load 16.

Alternatively, the upper rollers 23 could be dispensed with, in favour of retractable lower rollers 33, this being the preferred configuration adopted for the embodiments of FIGS. 10 onwards, as described later.

A supplementary drive facility, for example a friction contact/slip chain or belt (not shown) may also be integrated with the bearing surfaces 22, 24, in order to generate and promote relative movement over those surfaces.

In this embodiment, the master pallet 18 is depicted under the entire suspended load 16 and surmounted by an array of multiple adjacent subsidiary pallets 17, each supporting subsidiary component loads 26, which cumulatively form the overall load 16.

(Linear translational) movement of the load deck 12 and supported load 16 in the direction of the arrow 25, progressively from the un/loading (collection) station towards and eventually onto the load deck 43 of a vehicle container 42 (which is effectively the delivery station), from one end thereof, is performed with the upper bearing deck 22 temporarily locked and the lower bearing deck 24 operative—i.e. so that the load deck 12 moves as a whole.

Either an integrated 'conveyor style' drive as discussed above or an external, say piston-in-cylinder or rack and pinion, drive (not shown) may be employed to initiate and control this overall integrated movement of load deck 12 and load 16.

Alternatively, an external coupled wire hawser or chain pulley or sprocket drive system may be employed.

Once the load 16 has been 'delivered' into the vehicle container 42, and provided it is pre-palletized, as is indeed the case with the FIG. 2 embodiment, it is deposited upon the container floor 43 simply by lowering of the rollers 23 of the upper bearing surface, so that the load 16 rests upon the pallets 17 and master pallet 18.

Complementary ribs (not shown) could be provided on the vehicle floor 43 aligned with underside pallet support ribs 21 (see FIG. 7) to promote the clearance between the underside of the pallet and the vehicle floor 43, thereby facilitating retraction of the load deck.

The 'released' load deck 12, relieved of the load 16 can simply be withdrawn by sliding from underneath the load 16, initially over the vehicle floor 43 and thence progressively over the original loading station support surface 19, ready for the next load 16.

The reverse procedure is adopted for unloading the vehicle container.

It is at this point that the provision of 'palletised loading', becomes significant, since the load 16 needs some form of downwardly depending (say outer longitudinal) support ribs 21 (as shown in FIG. 7), in between or around which the load deck 12 may be inserted and which are capable of supporting the load, without the intervention of the load deck 12.

This facility could also allow the load deck 12 to be introduced under a pre-assembled load 16 in the first instance, without having to assemble the load 16 upon the deck 12.

The 'depth compressibility', e.g. by the lowering provision of the upper bearing surface 22, of the load deck 12 itself, is also a critical factor in creating a working clearance between the underside of the load 16 and the vehicle floor 43, and more importantly, between the underside of the load 16 and that upper bearing surface 22—given that the lower bearing surface 24 needs to run along the vehicle floor 43, in order to withdraw the load deck 12 from the vehicle container 42.

Figure 3:
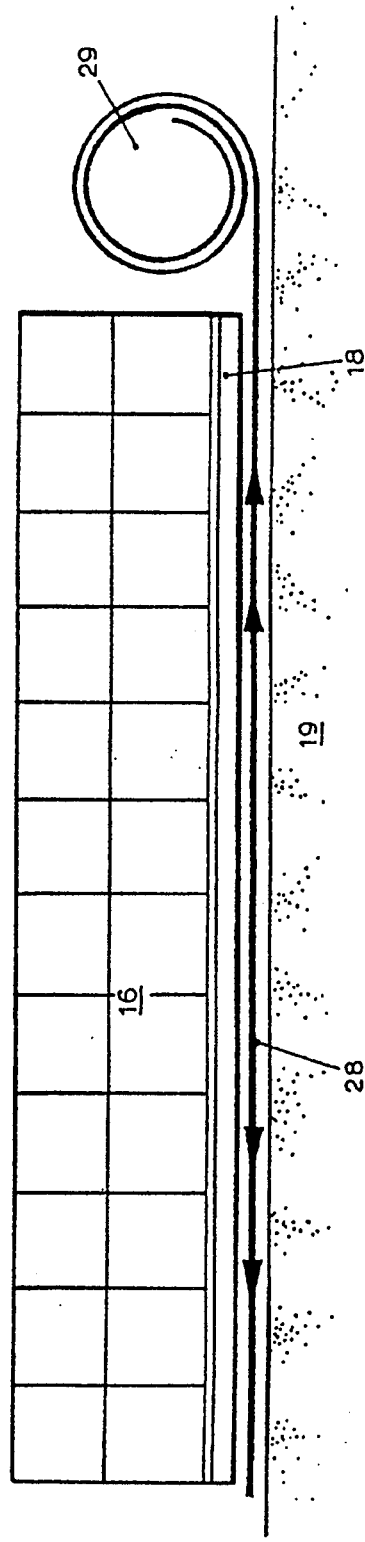
FIG. 3 shows the loading principle of FIG. 1 applied to another form of retractable deck, in the form of a coiled sheet, with the master pallet being optional.

FIG. 3 depicts an alternative so-called 'magic carpet' construction, in which a flexible 'bearing sheet' 28 combines the functions of both the load deck 12, integrated load movement bearings and a master pallet 18.

Both upper and lower surfaces of the sheet 28 are self-lubricating, so that it may be withdrawn from under the load 16 by free sliding contact between the underside of the load 16 and the vehicle floor 43.

The sheet 28 is sufficiently flexible that it may be coiled on a drum 29 when retracted.

Both insertion and withdrawal of the sheet 28 can be implemented by powered rotation of the drum 29.

In either case, slight tipping of the load 16 may occur to accommodate the intrusion of the shallow sheet depth 28.

A laminated or multi-layer sheet construction may be employed, with say an outer resilient porous membrane, into which compressed air may be fed and subsequently slowly and continuously bled from external surface pores to achieve an air bearing, with a marginal clearance from the surface of the sheet 28.

A combination of low friction surface coating, low contact area surface profile (e.g. nylon mesh) to the sheet 28 and such a surface air bearing (e.g. between the mesh pores and/or from the mesh strands themselves) could be used to 'free' even heavy loads sufficiently to allow the necessary sheet movement, particularly with an initial 'jerk' or impulse action.

However, for a fluid, e.g. air, bearing to be effective, the underside of the load 16 would need a suitable complementary (preferably smooth sealed) profile.

With appropriate valving and a dual membrane separated by a sprung steel strip (or resilient plastics) core, selectively operable upper and lower air bearing surfaces may be created.

A parallel to such a 'magic-carpet' foldable load deck may be achieved by a development of the load (deck) finger construction of FIG. 10 onwards, as described later, and in which a limiting case of relatively short finger 'stubs' are close-coupled as a continuous flexible track—e.g. in the manner of a track-laying vehicle.

Such stub fingers could be reeled in a coil mounted upon, say, a cylindrical sprocket hub drum, which would transmit the drive.

The drum could be located below a load support surface, with the finger track accessible through an aperture, from which it could be introduced under the load and withdrawn therefrom, without occupying additional space at the side of the drum. This would keep the loading bay size to a minimum representing the actual load size.

A more conventional mechanical bearing arrangement for the load deck 12, utilizing existing roller deck technology, is shown in FIGS. 4A and 4B, depicting respectively the raised and lowered deck conditions.

The upper deck bearing rollers 23 are retractable by means of continuous fluid-filled support bags 38, whose outer sheathes 39 engage the undersides of the rollers 23 and seal an internal fluid chamber.

The fluid chambers of the bags 38 can be selectively pressurized, in order to inflate the bags 38 and raise the rollers 23 (as illustrated in FIG. 4A), or deflated to lower the rollers 23 (as illustrated in FIG. 4B).

These same bags 38 cumulatively act as a form of 'fluidized' load bed, contributing a cushioning action in absorbing impact loads and minor height irregularities on the load deck 12.

Intermediate rollers 53 between and alongside the retractable rollers 23 provide a restricted load bearing action, even with the rollers 23 lowered, which facilitates removal of the load deck 12 from beneath the master pallet 18.

Figure 5:
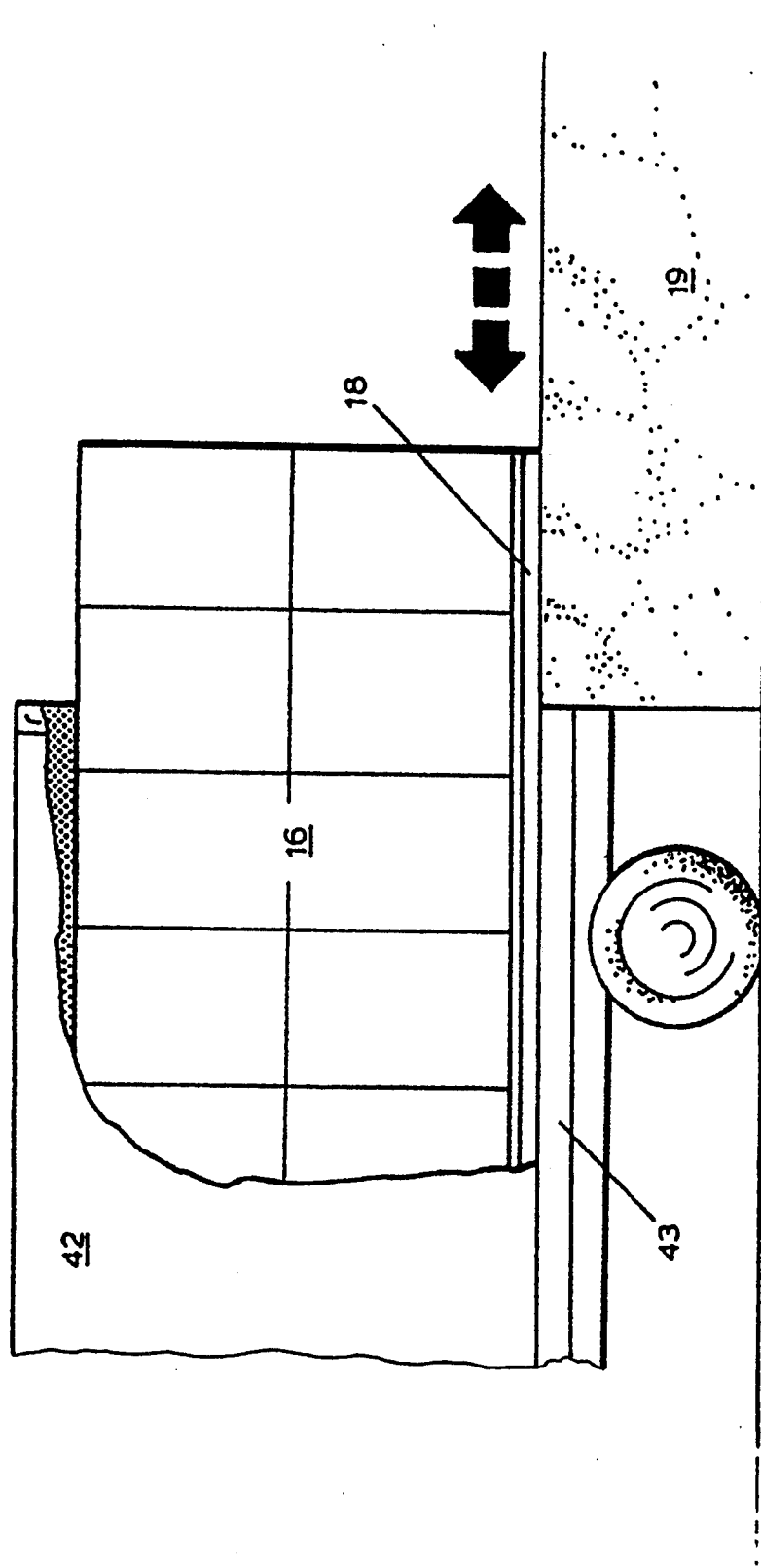
FIG. 5 shows a side elevation of the loading of a vehicle container with the arrangements of FIGS. 1 through 4.

FIG. 5 shows the load deck 12 in the raised condition and bearing the full weight of the load 16, under insertion into a vehicle container 42.

Figure 6B:
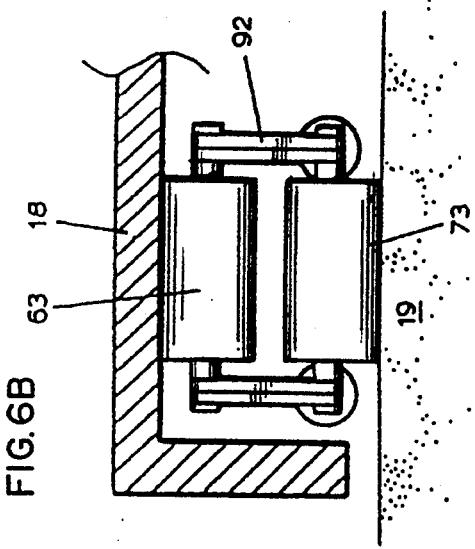
FIGS. 6A and 6B show an alternative roller bearing deck mounting arrangement to that shown in FIG. 4.
Figure 6A:
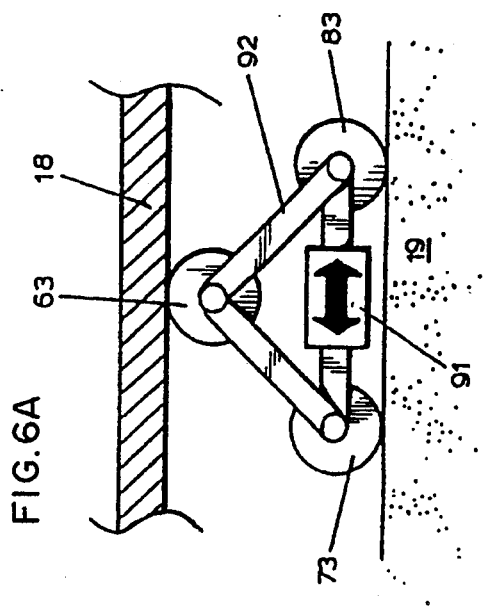

FIG. 6A shows an alternative retractable bearing roller arrangement for the load deck 12, in which a triangular braced carriage frame 92 carries an array of an upper roller 63, at its upper apex, contacting the underside of the load 16, and a depending pair of lower rollers 73, 83, which remain in contact with the un/-loading station support surface 19.

The lower horizontal leg of the frame 92 incorporates an intervening pneumatic or hydraulic strut 91, extensible or retractable to vary the spacing between the lower rollers 73, 83 and thus the degree of 'collapsed' triangulation of the frame 92 and the height of the upper roller 63 in relation to the lower pair of rollers 73, 83.

FIG. 6B shows in transverse section the variable height bearing action of the, roller assembly 63, 73 and 83.

FIG. 7 shows, in side elevation/transverse section a pair of standard sized subsidiary pallets 17 upon a master pallet 18 of corresponding constructional form.

Figure 8A:
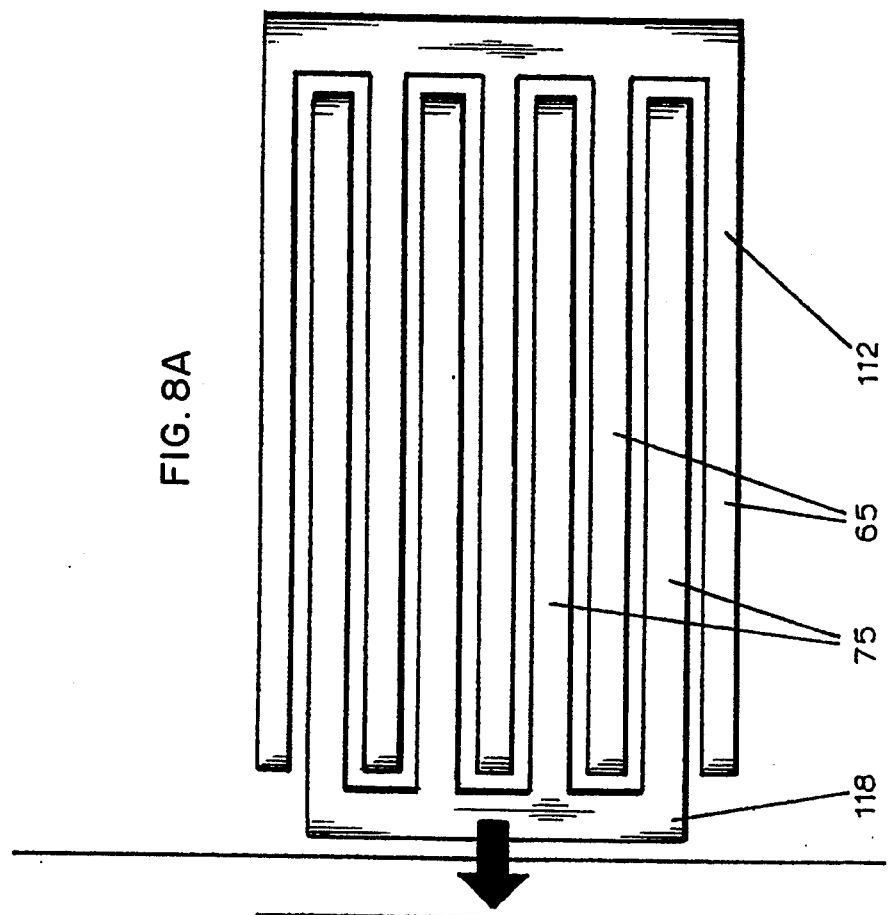
FIGS. 8A and 8B show an alternative retractable loading deck arrangement to that of FIGS. 2 through 7.
Figure 8B:
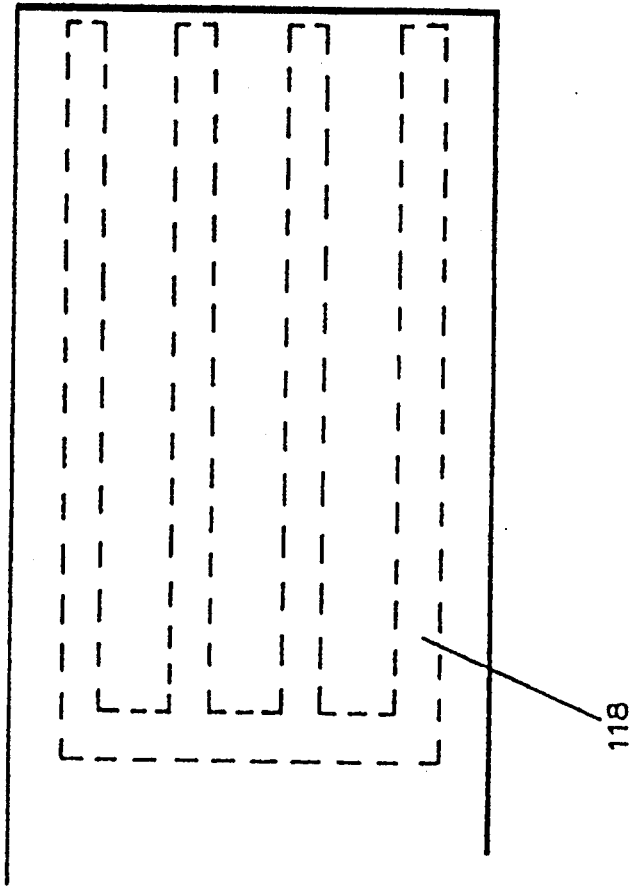

FIGS. 8A and 8B show, in plan view, another relative configuration of load deck 112 and master pallet 118, to facilitate the introduction of a load deck underneath the load, albeit along a single axis, without increasing the load height.

Complementary multiple (comb-like) interfitting tongues or limbs 65 and 75 on the load deck 112 and master pallet 118 respectively are laterally offset, to allow feeding and withdrawal of the master pallet 118 and a load 16 supported thereupon, from the un/loading station 19 into a delivery station within the vehicle container 42.

FIG. 8A illustrates the (vehicle container 42) unloaded condition, with the master pallet 118 nested with the load deck 112, and FIG. 8B indicates the loaded condition, with the master pallet 118 resting upon the vehicle container floor 43 and the load deck 112 withdrawn.

FIGS. 9A and 9B are the corresponding side elevational views to FIGS. 8A and 8B respectively.

It should be appreciated that many mechanical alternatives and equivalents may be used to those described to implement the principles of the invention.

Similarly, a diversity of power sources, including electric, mechanical (including internal combustion engines), pneumatic and hydraulic may be used singly or in combination.

If a master pallet is employed, it may be fabricated in several component pieces to allow disassembly to facilitate removal and (re-)installation.

The mobile load deck could be constructed to a scale and proportion to accommodate any partial load, and multiple (coupled) load decks could be used in succession to accumulate the full load—e.g. in the manner of the load finger arrangement described later in relation to the embodiments of FIG. 10 onwards.

Thus, in principle, each individual pallet 17 could have its own (one or more) load deck 12, for greater flexibility of un/loading.

Moreover, an individual load deck 12 could form part of a continuous overall warehouse floor with an integrated bearing surface, so that mobile portions thereof could effectively be removed, inserted and transposed in the manner of a patchwork grid, to achieve greater facility for automated storage and un/loading.

In practice, overall 'flatness' of the vehicle container load deck 43 may be critical, (particularly for older and 'worn' or distorted containers)—in which case the load deck 12 could accommodate a miniaturised suspension to ride over local such irregularities, and the intermediate ancillary rollers 53 could incorporate resilient or floating mountings, to withdrawal of the load deck 12 from underside the load 16. The load deck 12 could be mounted on jacking legs (e.g. a scissor-action type) to allow loading of stacked containers 42, i.e. with their load decks 43 above the loading station surface 19.

Thus a 'passive' array of containers, stacked say, several containers high, could be loaded without having to move any individual container—again facilitating automated un/loading.

The bearings on the load deck 12 could be disposed to allow transverse or longitudinal un/loading, or any combination thereof, for greater operational flexibility.

Figure 10:
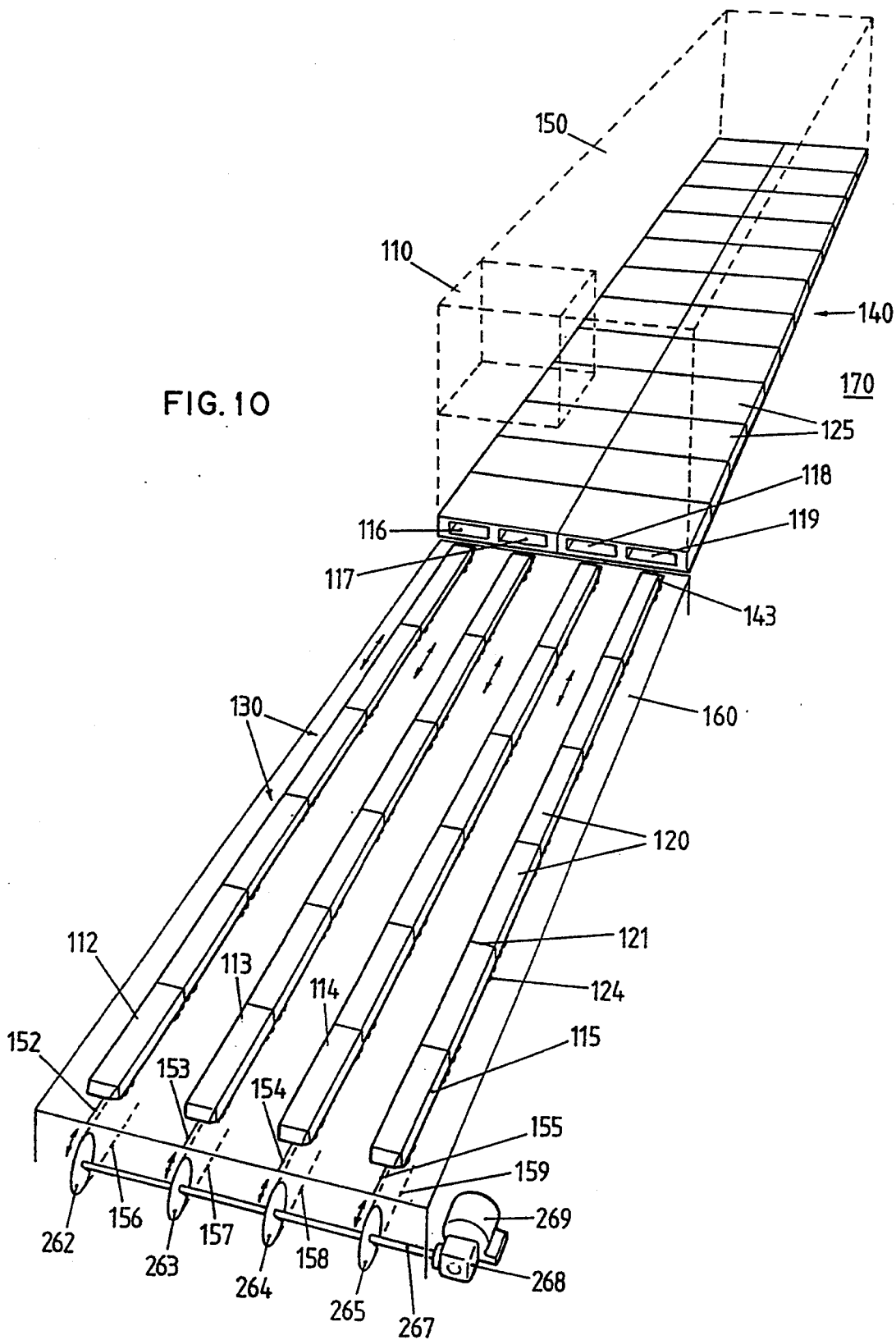
FIG. 10 shows a perspective view of an assembled palletized, multi-component load formation together with an associated load (deck) finger array.

In the loading arrangement of FIG. 10, a bulk load 150 comprises a rectangular matrix or grid (pallet) array 140 of abutting or marginally-spaced individual subsidiary palletized load components 110, using standard pallets 125.

Figure 18:
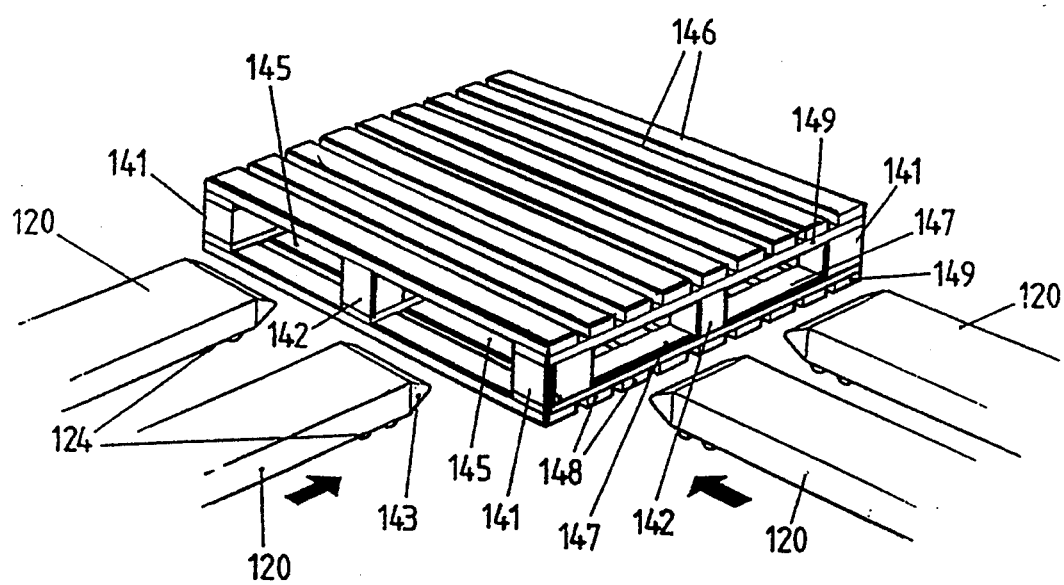
FIG. 18 shows the load finger access of a four-way entry, base perimeter pallet construction, for the palletized loading of FIGS. 10 through 17.
Figure 19:
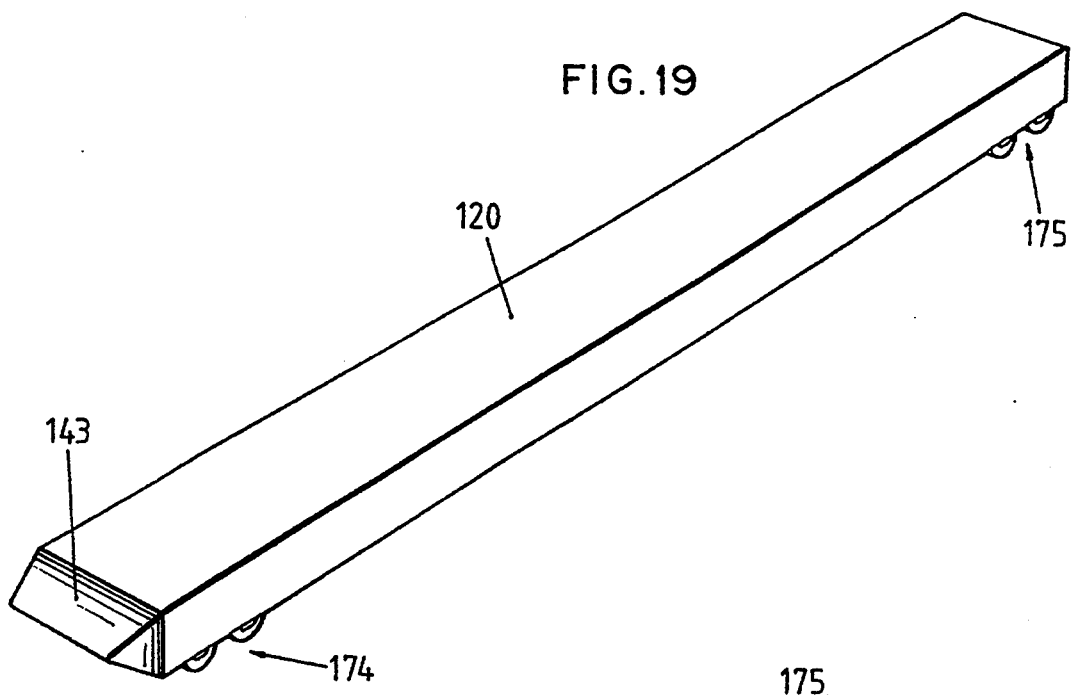
FIG. 19 shows an upper perspective view of an individual load support finger.

As shown in more detail in FIG. 18, the individual pallet 125 may be square, in which case typically 1000×1000 mm (with a 5 mm tolerance), or rectangular, in which case typically 1000×1200 mm, with an overall pallet height or depth of 162 mm and a through gap of 95 mm on one opposite pair of sides and 120 mm on the other pair of opposite sides.

FIG. 18 shows a typical so-called 'base-perimeter' pallet 125 construction, in which a series of spaced slats 146 form one (e.g. upper) support platform, with a corresponding opposite (e.g. lower) support platform formed of similar slats 148, marginally spaced therefrom by a series of corner blocks 141 and intermediate side and centre blocks 142.

Thus on one pair of opposite sides of the pallets 125 are defined two parallel 'through'-passages 145 and on the remaining opposite sides another series of through passages 147, along either of which the pairs of load fingers 120 may pass using their surface runners 124.

In fact, because of intervening transverse bracing slats 149, the 'through'-passages 147 are shallower than the through passages 145, the differences for example being of the order of 95 mm as opposed to 120 mm.

Figure 20:
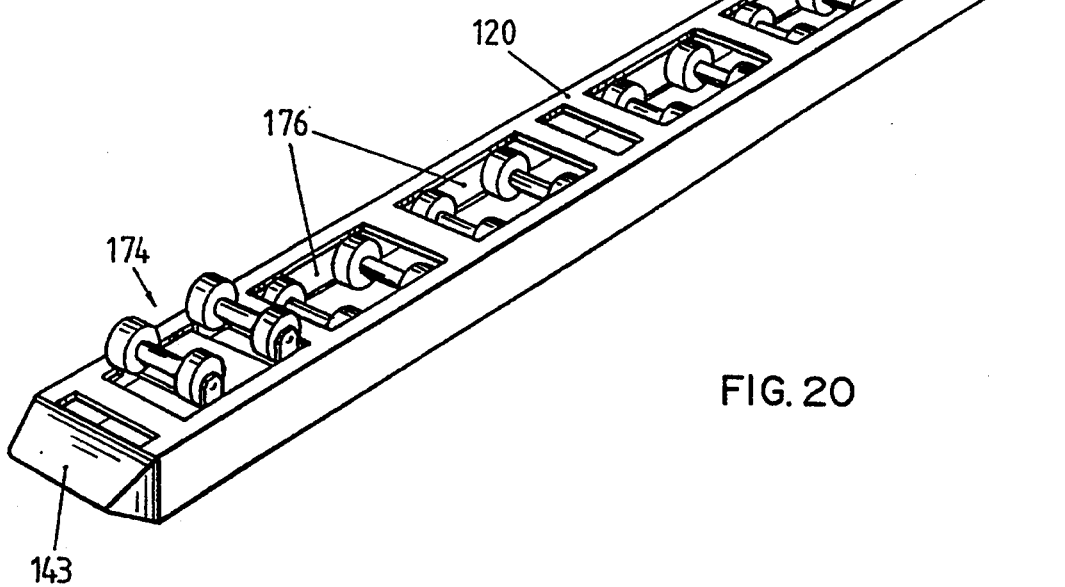
FIG. 20 shows an underside perspective view of the load finger of FIG. 19.

In practice the lower bracing slats 149 represent a surface obstruction (typically some 25 mm deep) to the entry of the runners 124 of the load fingers 120 and for this reason the end runners 124 are specially configured as bogies incorporating 'jockey' wheel sets 174, 175 (described in more detail in relation to FIGS. 20 and 23), either trailing or loading according to the direction of finger movement.

Encouraged by a tapered nose profile 143 of the load finger 120, the end bogies 174. 175 may ride over the successive slats 149, as depicted in FIGS. 24A through 24C.

The intervening runners 124 are configured as wholly retractable intermediate bogies 176 within the load fingers 120, to minimize the interaction with the pallet slats 149 during insertion of the load fingers 120 through the pallet passages 145 or 147.

This also avoids inadvertent expansion loads, which could risk bursting a pallet open by prising apart the upper and lower slatted platforms.

Thus the intermediate bogies 176 are not normally 'deployed' during the unloaded condition of the load fingers 120, which rely until loading solely upon the end bogies 174, 175.

Reverting to FIG. 10, the particular pallet assembly 140 depicted—but which admits of considerable variation according the 'receiving' load capacity—represents twelve pallets 125 in length by two pallets 125 in width—that is a total of twenty four pallets 125—which are moved as a unitary whole load 150 into a container (not shown in FIG. 10, but shown at 190 in FIGS. 11-17).

In some instances, for example where rectangular pallets 125 are orientated with their longer sides aligned with, rather than transversely of, the longitudinal extent of the pallet array 140, only eleven pallets 125 may be accommodated in line.

Corresponding to the pallet array 140 is an array 130 of loading fingers 120 arranged in four generally parallel rows 112, 113, 114 and 115, each of five individual load support 'fingers' 120, close-coupled in tandem.

The rows 112, 113, 114 and 115 of load fingers 120 are aligned with corresponding aligned through-passages 116, 117, 118 and 119 respectively in the 'queued' sequential array 140 of pallets 125.

The individual load fingers 120 are mobile upon (surface-contact) runners (or low-friction skids) 124, described in more detail in FIGS. 19 through 24, and can traverse longitudinally—and to a limited extent track transversely, by means of a steering facility shown in FIG. 27. This could enable the fingers 120 to follow a (shallow) curved path if so desired.

This load finger 120 configuration is adapted for mobilizing an otherwise essentially static or immobile load 150 resting passively upon a support surface 170.

However, in certain special loading applications, the load 150—whilst possibly not enjoying great maneuverability in a confined space—may nevertheless have some inherent mobility, and may even incorporate runners raising it clear of the support surface. In such situations the loading fingers 120 may provide additional freedom of movement and the drive facility for initiating such movement.

For a static or passive load 150, such mobilization may require clearing the bulk of the load 150 from a support surface 170—and this in turn generally implies some lifting or elevation of the load 150 and a load supporting span between localized points of rolling and/or sliding surface contact.

Thus the load fingers 120 desirably incorporate such a load lifting capability, deployed as necessary. In that regard, generally there will be a practical limitation in ultimate lifting height in relation to the overall finger height in the retracted condition. The latter may be critical when it is necessary to introduce the finger with some operating clearance underneath a load supported marginally from a surface 170—as with a palletized load, where a further limitation is introduced by the need to feed fingers 120 through the upper and lower bracing ledges of the pallet edges.

Figure 25:
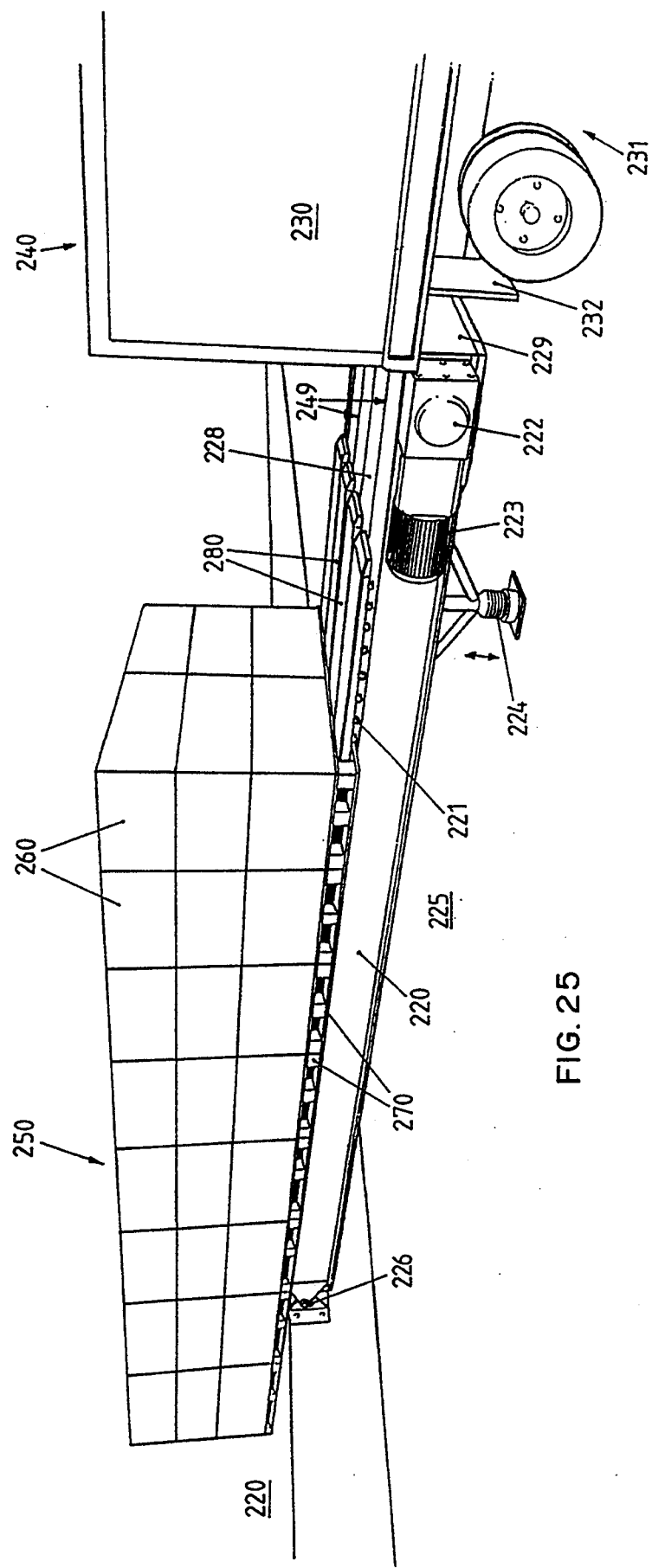
FIG. 25 shows a perspective view of a movable load deck configured as a bridge beam for supporting the load finger array of FIG. 10.

The load fingers 120 run initially upon a load (support and drive) deck 160, which itself may be provided with some freedom of movement for adjusting loading alignment, as shown in FIG. 25.

It is envisaged that such adjustment might be advantageous when transferring loads 150 to and from a road vehicle, whose empty to full-laden height may vary according to suspension action and from vehicle to vehicle. Moreover, vehicle load decks 191, particularly for articulated tractor and trailer combinations, may be canted slightly upwards from the rear axle to the tractor cab.

Indeed, one end of the load deck 160 may be coupled to the vehicle deck 191, in order to move with it, including minor (chassis runners) twisting distortion and vertical displacement, whilst the other end is pivotally mounted upon a stand.

Similarly, mechanical (e.g. screw) or hydraulic (e.g. telescopic piston-in-cylinder) lifting jacks may be deployed to adjust the 'approach angle' and orientation of the load deck.

Indeed, the entire load deck 160 could be mounted for transverse translational movement, for example between successive adjacent loads and loading stations. Some form of lateral guideway or rail may be provided for this. Alternatively, a simple ground-braced static load deck 160 may be employed.

Figure 11:
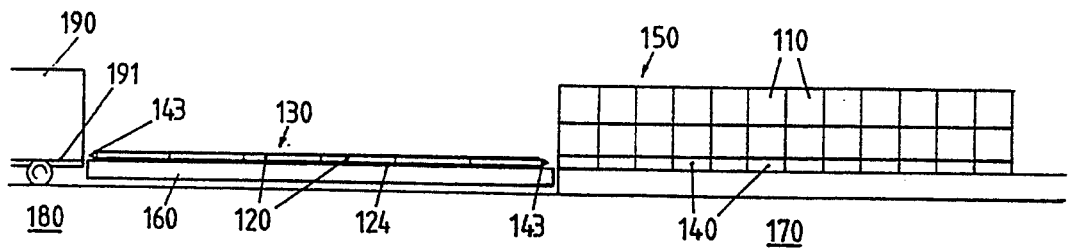
FIGS. 11 through 17 show a loading sequence for the pallet and load finger array of FIG. 10.

A typical overall loading and unloading operational sequence for a palletized load for a containerization, for example a container vehicle, and using base perimeter pallets which have to be approached from one side (see FIG. 18), is now described with reference to FIGS. 11 through 17, as follows:

(i) Initially a full container load is formed as a 'unitary' bulk stack 150, of assembled individual subsidiary component loads 110, at a loading station support surface 170, upon a palletized array 140, such as depicted in FIG. 10. The load finger array 130 thus initially is 'collated' and parked to one side of the load 150, as depicted in FIG. 11.

Figure 12:
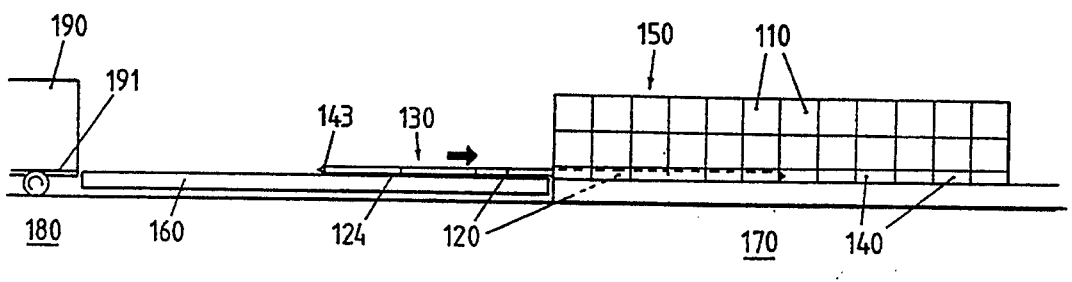

(ii) The load finger array 130 is then moved as a whole, by a drive (shown in FIGS. 10 and 26), incorporated in the load deck 160, through the pallet array 140, as depicted in FIG. 12.

Figure 13:
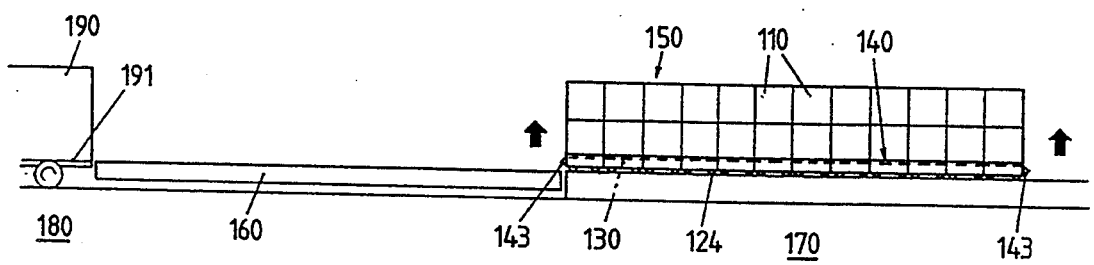

(iii) Once the entire load finger array 130 is positioned underneath the pallet array 140, the entire load 150 is lifted (marginally) clear of the support surface of the load parking station 170, as depicted in FIG. 13. That is the individual pallets 125 are penetrated collectively by the entrained load fingers 120 and raised out of ground contact. In this temporary condition the entire load weight is distributed over the local (mobile) points of end contact bearing runners 124 on the underside of the load fingers 120, as detailed in FIG. 20.

Figure 14:
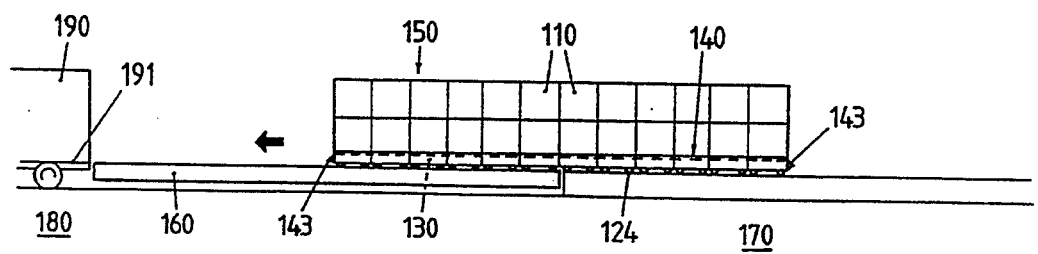

(iv) The elevated load 150 carried by the load finger array 130 back over the load deck 160, by the same (unshown) drive means incorporated into the deck, as depicted in FIG. 14.

Figure 15:
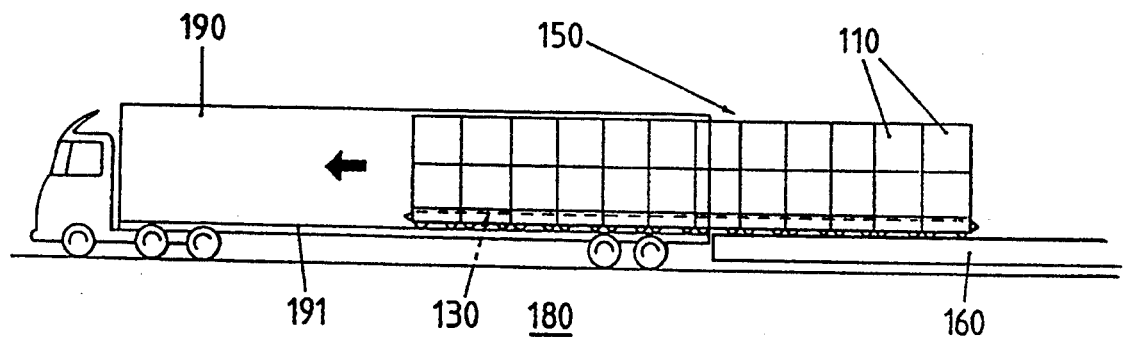

(v) The entire load movement is continued into a (vehicle) container 190 parked at a delivery station 180 located at the opposite end of the load deck 160 to the load parking station 170, as depicted in FIG. 15.

Figure 16:
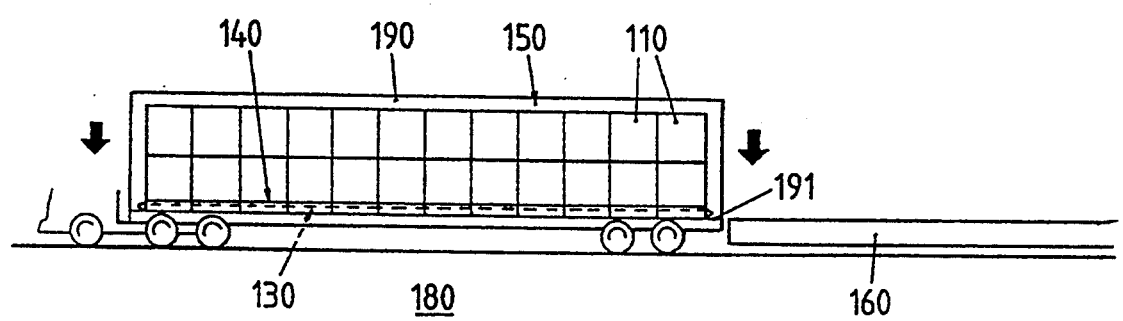

(vi) Once fully inside the container 190, the entire load 150 is then deposited upon the floor 191 of the container 190, by contracting the load finger depth, as depicted in FIG. 16.

Figure 17:
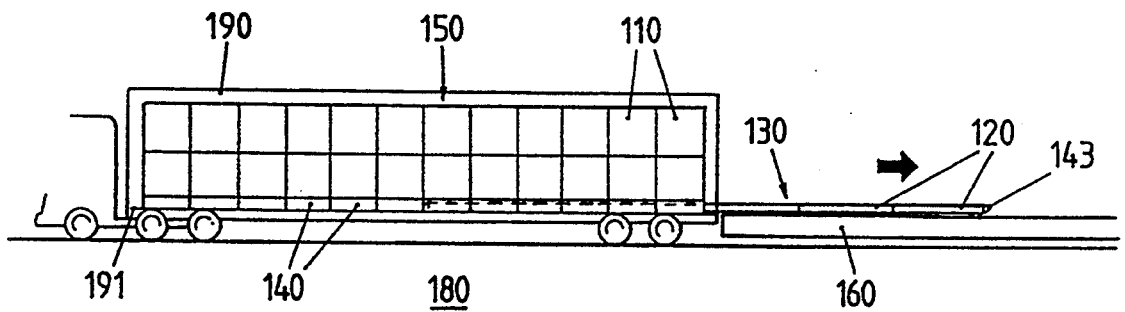

(vii) Finally, as depicted in FIG. 17, and with the entire load 15 resting securely on the container floor 191, and with the load finger array 130 out of (at least lifting) contact with the pallet array 140, the load finger array 130 is free to be withdrawn, again by the load deck drive, completely from the container 190, until it rests again completely over the load deck 160, ready for the cycle to be repeated, once another load has been formed at the parking station 170.

FIGS. 19, 20, 21 and 23 show an individual load finger 120 fabrication from folded steel sheet forming a u-section trough, with underside cross-bracing around apertures receiving bearing runners 124, grouped in pairs of twin wheel axles, or bogies 174, 175 and 176.

Thus, from the upper surface plate 131 two depending side skirts 132, with lower inturned flanges 133, braced by cross-members 182, accommodate a succession of movable 'floating' bogies 174, 175 and 176, also fabricated in a similar folded sheet manner.

FIG. 21 details an intermediate bogie 176 construction, in which a pair of spaced axles 164, 166, with associated wheel sets 163 and 165 respectively, are carried by side arms 194, 195 depending from the bogie top plate 178.

Between the bogie top plate 178 and the underside of the finger top plate 131 is sandwiched an inflatable longitudinal bag 185.

Thus the intermediate bogies 176 perform the primary finger and thus load lifting function and distribute the lifted load gross weight in the elevated condition.

Lateral location of the bogie 176 is by side restraining plates 187, also entraining transverse locating and bearer reaction pins 184 for a pair of 'suspension' leaf springs 177, one on either side of the bogie 176—and which resiliently bias the bogie towards the bag 185.

The remaining bearing runners 124, and indeed the only ones operative outside load lifting, comprise bogies 174, 175 at opposite ends of the load finger.

The bogies 174, 175 are mounted upon a spring leaf suspension detailed in FIG. 21, for general rolling surface contact when the load finger 120 is unloaded, for example when it is being inserted into and withdrawn from a pallet 125.

The construction of the bogies 174, 175 corresponds generally to that of the intermediate bogies 176 of FIG. 21, except that the spaced leaf springs 186 are mounted in the opposite sense to the springs 177—that is to bias the bogies 174, 175 downwardly away from the inflatable bag 185.

In either case some minor rocking movement of the bogies 174, 175 and 176 can be accommodated by the composite mechanical spring and pressurised air bag resilient mounting.

According to the direction of movement (generally linear translational along the longitudinal finger axis) so the jockey wheels 174, 175 are alternatively leading or trailing.

Some degree of limited castor action may be incorporated so that the wheels are generally self-aligning with respect to the direction of movement. It is these same 'jockey' wheels that are specially mounted for clearing ground obstructions.

The loading ends of at least the outermost load fingers 120 are provided with a tapered nose cone 143, which may also incorporate steering and position sensing for controlling the finger movement in relation to the load and the load movement itself once collectively borne by the coupled fingers 120.

Successive fingers 120 are connected by a resilient tie plate 121, which allows some freedom of relative finger movement, but introduces some conformity or restraint, tending to maintain the overall alignment of the fingers 120.

Finger alignment is also promoted by incorporating a series of spaced parallel guide rails or tracks 152, 153, 154 and 155 in the load deck 160, which locate between the wheels of each bogie axle set, and with intervening slots through which access is given to corresponding drive chains 156, 157, 158 and 159, running over sprockets 262, 263, 264 and 265 mounted upon a common drive shaft 267 to an electric drive motor 269 through a reduction gearbox 268.

Thus, whenever the load finger array 130 traverses the load deck 160, some regulatory self-aligning discipline is imposed, which is conveyed to the array 130 when it passes largely, if not entirely off the load deck 160, in either the parking station 170 or loading station 180, as described with reference to FIGS. 12/13 and 15/16.

Any tendency for the fingers 120 to stray or wander, whether unloaded or loaded, is thus undermined—although the overall steering or 'alignment' facility may be used to correct misalignment errors.

Each load finger 120 is to some extent self-contained, at least in terms of mobility and load elevation, apart from the power source, which is introduced by a mobile traveller coupling described later.

Thus the load finger 120 is utilised as a form of carriage, in a train of carriages formed by the load fingers collectively in a row—and of which there are several (in this case four) in parallel formation, and sharing a common drive, to achieve the desired driving torque and load traverse speed.

More esoteric drives may be used, such as linear induction motors possibly integrated with some form of magnetic levitation.

The load finger configuration is to some extent determined by considerations attendant with the load palletization, and in that regard a load finger of convenient operational proportions is achieved by adopting a length sufficient to accommodate two pallets in tandem. Similarly, the load finger width and height is prescribed by size and proportion of the available apertures in the pallet side depth.

It follows that a 'bespoke' pallet would admit of other, potentially radically different, load finger configurations, without departing from the principle of load mobility afforded by the invention. In particular, load mobility is achievable by introducing a (single) bearing surface on the underside of the fingers—although additional (e.g. retractable) runners may be incorporated on the upper side of the load fingers.

Referring to FIGS. 21 and 22, individual finger elevation is achieved by an internal inflatable pneumatic (i.e. air) bag 185, which bears against the undersides of individual wheel bogies 183.

In the case of load-spreading/sharing intermediate bogies 176, such (downward) air bag inflation is against the (upwards) bias of laterally-spaced (leaf) spring sets 186 on opposite sides of each individual bogie.

In the case of the end bogies 174, 175, which are biassed downwardly by the associated spaced leaf spring sets 186, the latter also provide some suspension cushioning action.

Referring to FIGS. 22A through 22C, as localized longitudinal sections through the load fingers 120, the variable ride-height and suspension movement of an intermediate bogie 176 is depicted, including that upon encountering a ground obstacle 193, such as in particular the ground engaging underside bracing rib of a pallet.

Thus, in FIG. 22A, an intermediate bogie 176 is shown in its fully elevated or retracted position entirely within the frame embrace of a load finger 120, so that the overall depth of the finger is not increased locally thereby. This is important when seeking to feed the load finger through a restricted opening, such as an 'under-pallet' gap, as discussed elsewhere.

In this retracted condition the longitudinal air bag 185 within the load finger 120 is fully deflated and compressed (although a residual air pressure insufficient to overcome upward 'suspension' bias of the leaf springs 177 could be maintained).

Thus the frame 178 of the bogie 176 is in close abutment with the bag 185, which is sandwiched between it and the upper plate 131 of the load finger 120.

In FIG. 22B, the intermediate bogie 176 is shown in its fully lowered or extended condition, with the wheels 163, 165 in contact with a support surface 200.

This extended bogie condition is achieved by (fully) inflating the longitudinal air bag 185, until it fills a larger part of the internal depth of the load finger 120 and if necessary until the bogie frame 178 abuts the edge flanges 133, as a physical limit stop.

Although not specifically illustrated, the spring mounting of the intermediate bogie 176 against the air bag 185, combines to afford a limited suspension cushioning action, which will accommodate some longitudinal and lateral 'rocking' motion for riding over ground obstacles, in a manner corresponding to that of the loading and trailing end bogies 174, 175, as described elsewhere, in particular in relation to FIGS. 23, 24B and 24C.

FIG. 24A shows an end bogie 174, 175 in normal ground engagement until encountering an obstacle 193 (such as a pallet bracing slat), whereupon, as depicted in FIG. 24B, the load wheel pair simply rides over the obstacle with a jockey wheel action, followed, as depicted in FIG. 24C by the trailing wheel pair.

Such unilateral wheel movement is accommodated by deformation of the suspension springs 186, the bogie frame being normally clear of the (deflated) air bag 185, but the latter can still be compressed locally even when inflated to achieve the load finger lifting action.

FIG. 25 shows a preferred construction of adjustable or 'floating' load deck 220, incorporating a pivot mounting 226 at one end, with a 'free' opposite end adjustable in height by a mechanical screw and/or hydraulic jack 229 reacting between the load deck 220 and a support surface 225.

Such height adjustment enables alignment of the upper load transfer surface 228 of the loading deck 220 with the load deck, 232 of a container 230 mounted upon a trailer 231 of a road vehicle 240.

Indeed, a physical coupling 229 may be provided between the outer end of the load deck 220 and the vehicle chassis or container floor 232, so that they remain aligned, even under vehicle suspension deflection with the varying vehicle load.

Similarly, if the vehicle or container deck 232 is uneven or distorted (e.g. twisted), whether through construction or use, the load deck 220 may be aligned in the optimum practical way with it.

Although depicted fixed at one point, the load deck 220 may be movable, (e.g. transversely of its length) between (successive adjacent) loading stations, where vehicles or parked loads ready for transit are set.

Thus the end pivot support 226 may itself be mounted upon a rail or guide way and the undersides of the jacks 224 may incorporate (castor) runners or wheels.

Alternatively, the entire load deck 220 could be rotatably mounted upon a turntable, with loads and containers arranged radially around it.

In that sense, just as 'parallels' may be drawn the railway technology for developing additional facilities and refinements of the movement of the load fingers 280 upon the guideways 249 in the upper surface 228 of the load deck 220, so the latter itself may be regarded as a whole (i.e. on a larger scale altogether), as a movable carriage—and as an intermediary between a load and a load space therefor.

If, on the other hand, load deck 220 mobility is not a major consideration in a particular loading situation, then the load fingers 280 themselves may be afforded additional freedom of movement—even ultimately independently of any load deck guideway or drive.

That is the load fingers 280 could incorporate their own drive and guidance, as a specialised form of AGV (automatically guided vehicle), either with an on-board energy store, such as a battery or hydro-pneumatic pressure reservoir, or an umbilical connection with a power source.

Figure 26:
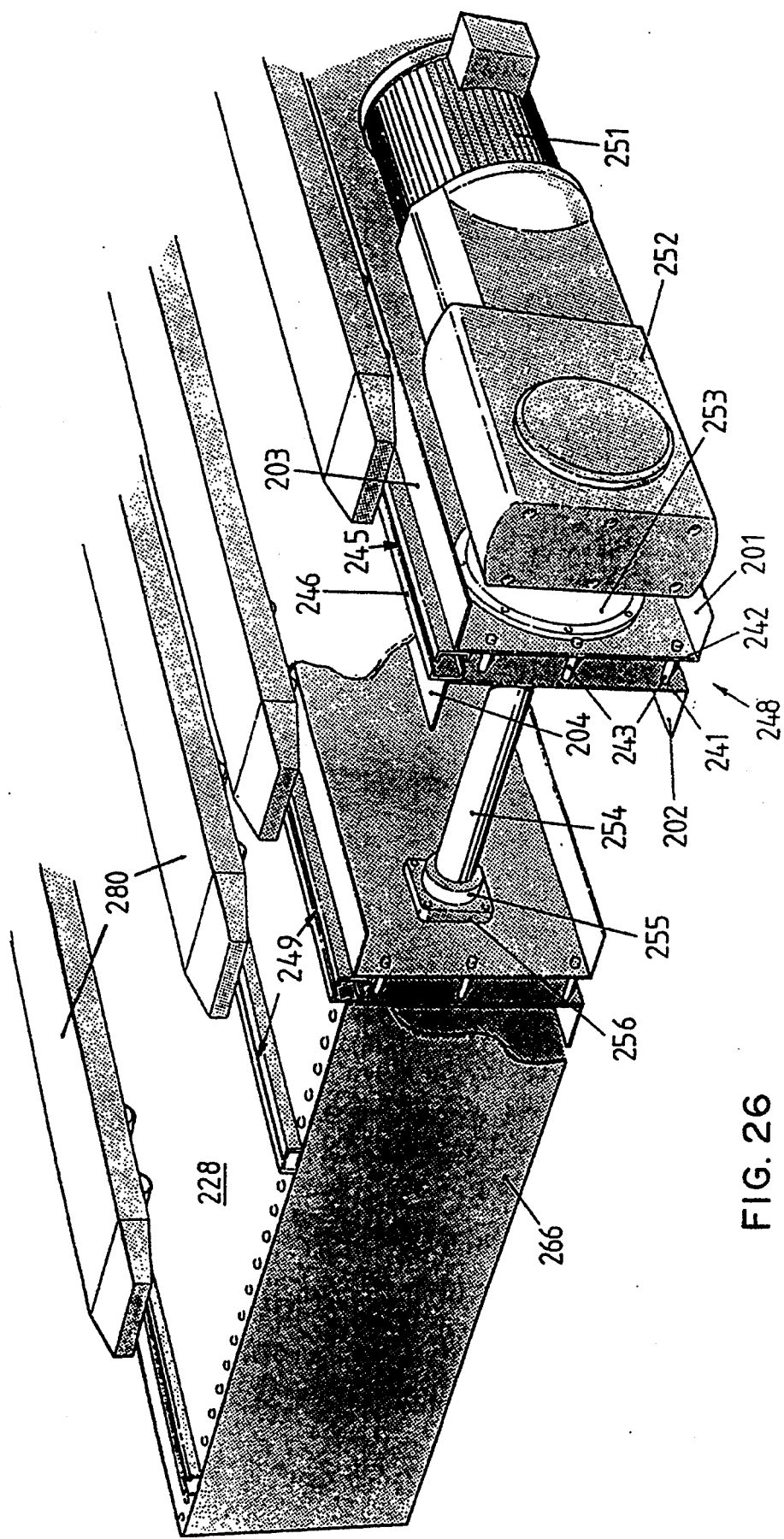
FIG. 26 shows a part cut-away view of the construction of the load bridge of FIG. 25.

Nevertheless, reverting to the movable load deck 220 arrangement, this lends itself to a compact, self-contained, rigid hollow 'box girder' beam construction, for example that detailed in FIG. 26.

In FIG. 26, a rectangular intersecting lattice or grid of pre-fabricated structural plates defines a series of spaced parallel guideways 249 with underlying aligned (chain) drive passages 248 accommodating an individual continuous chain loop (not shown) for corresponding rows of load fingers 280.

Such a hollow beam affords torsional and longitudinal bending stiffness, without undue overall weight penalty and can be entirely fabricated and the internal drive components fitted off-site in controlled factory conditions—with delivery on-site being achievable simply by carrying the load deck upon a trailer whose overall dimensions and proportions correspond broadly thereto with minimal overhang.

Thus specifically, four transversely-spaced pairs of marginally-spaced longitudinal upright stringer panels 241,242, with respective out-turned upper and lower flanges, 203, 204 and 201,202 are braced apart by spacer bolts 243 around and between an internal chain loop (not shown) between chain sprockets (not shown) at each end of the load deck beam 220.

The upper flanges 203, 204 provide convenient mounting surfaces for the upper deck panels 228 and between them are spaced side rail flanged strip members 245, 246 around which the runners 124 of the load fingers 280 embrace and through which a drive and pneumatic services for the internal air bags 185 is provided, as discussed later.

Mobile detachable drive couplings or travellers may be employed to bridge the gap between the concealed drive chains and the load fingers 280, and these may also couple the other services, such as a pneumatic supply for the load finger air bags and steering and an electrical supply for the load finger position sensing.

Such a traveller may move alternately between opposed chain drive sprockets at the extremities of movement, that is at opposite ends of the load deck 220. Two travellers may be employed for each row of fingers 280, one at each end mounted to engage the associated drive chain for a cycle of movement to one side of the load deck and then back over the load deck, whereupon that traveller disengages and the temporarily parked traveller at the opposite end engages and takes over for movement to the opposite side of the load deck and then back over the load deck—whereupon drive coupling reverts to the original traveller—and so on.

The longitudinal stringer panels 241, 242 are braced transversely by upright cross-panels, such as 266, and the upper deck panels 228. A corresponding lower deck platform could also be provided, with access apertures for the chain drive passages 248.

Drive is taken between successive chain channels 248 by transverse drive torque reaction tubes 254, providing internal drive shaft housings and which also provide some internal cross-bracing, fitting into bearings 255 mounted in flanged bearing houses 256.

At one end of the drive shaft torque-tube housing 254 is a bell housing 253 coupling a gearbox 252 with an electric drive motor 251.

For ease of illustration, the example of FIGS. 25 and 26, depicts the loading of an international standard container 230, with a capacity represented by a rectangular assembled gross load 250 of multiple individual subsidiary loads 260 upon an rectangular array of standard pallets 270, each in this case stacked individually several (e.g. two or three) deep with subsidiary loads 260.

The load is two pallets 260 in width by, in this case eight, but possibly eleven or twelve as with the preliminary general example of FIGS. 10 through 17.

In order to accommodate the dual pallet load width, four rows of load fingers 280, with four corresponding parallel guideways 249, grouped in two pairs, one pair for each of two rows of pallets 270—that is two fingers per pallet—are employed.

Figure 27C:
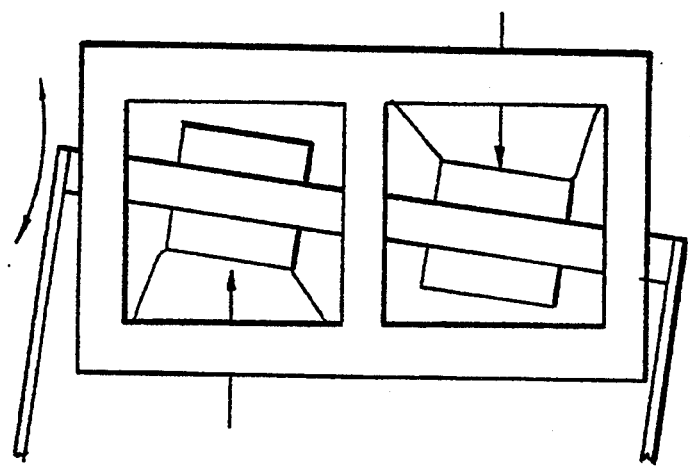
FIGS. 27A through 27C show the general operating principle and outline construction of a steerable articulating coupling between the successive load fingers of FIG. 10.
Figure 27B:
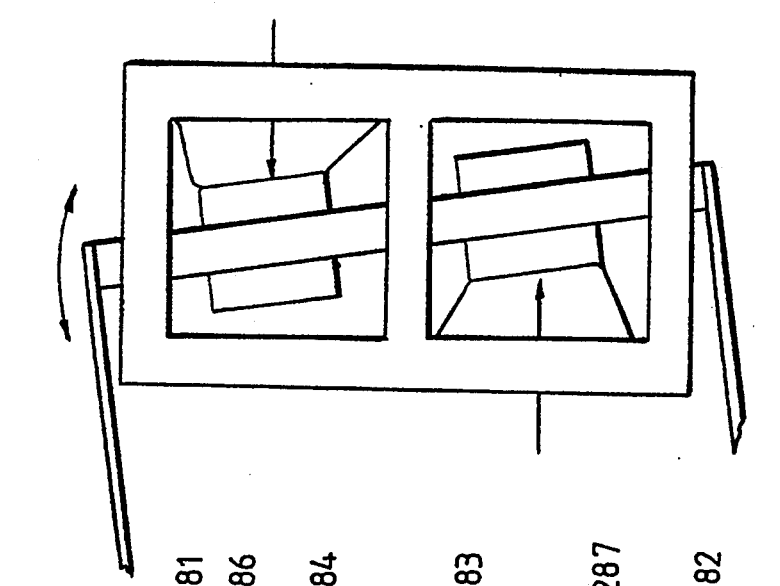
Figure 27A:
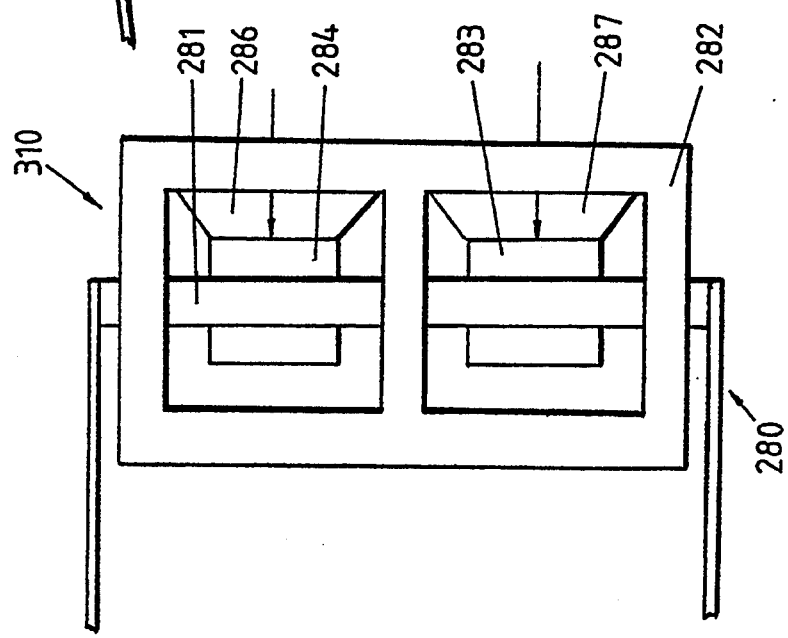
Figure 28:
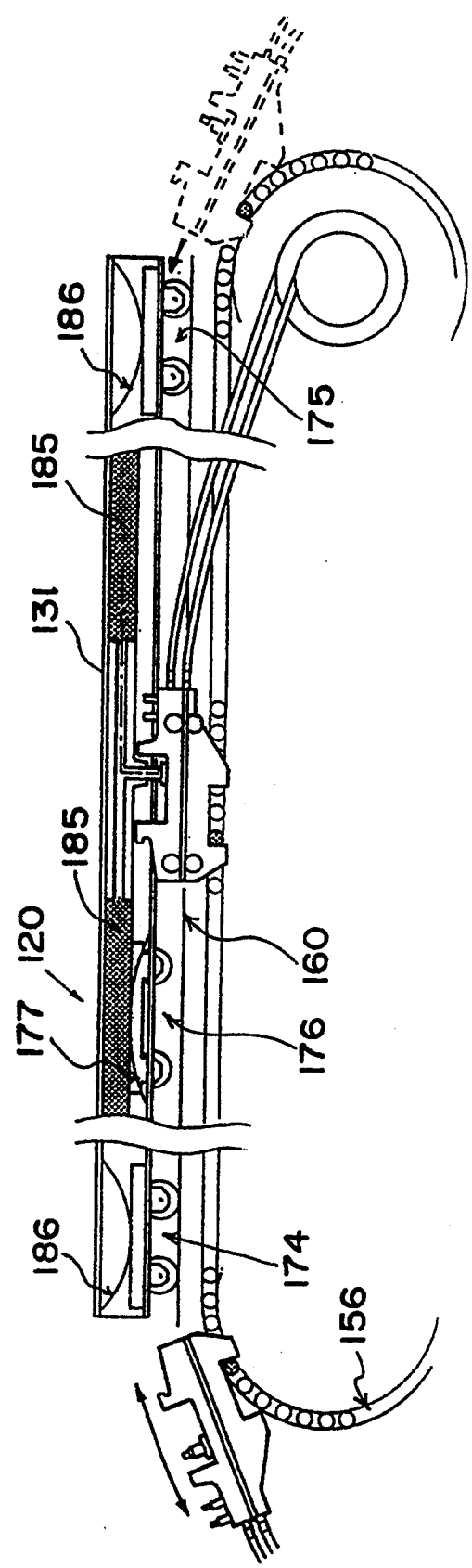
FIG. 28 shows a releasable traveller coupling for transmitting drive to the load fingers.
Figure 29:
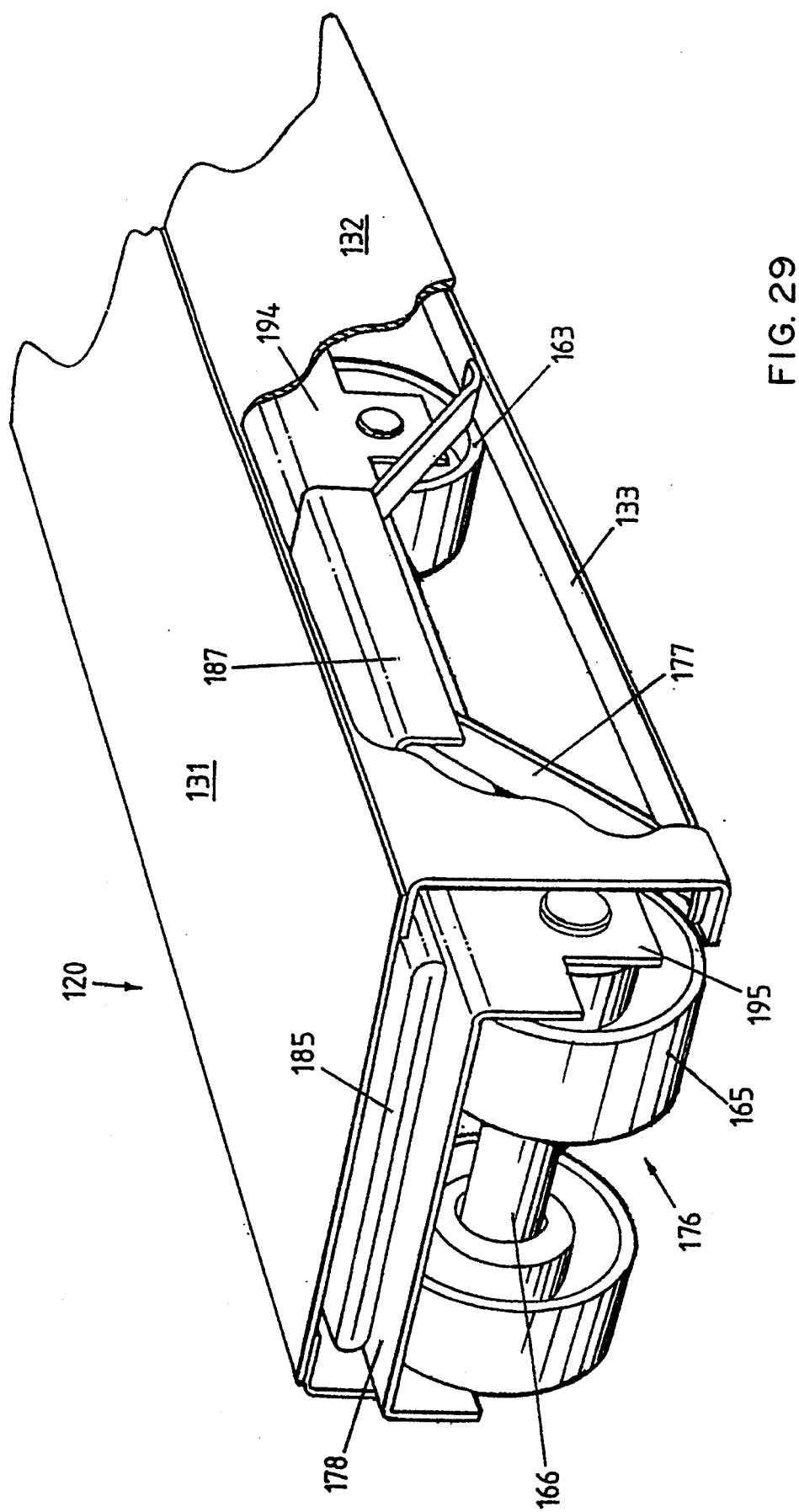
FIG. 29 shows a part cut-away view of a load finger at an intermediate bogie location, corresponding to that of FIG. 21.
Figure 30:
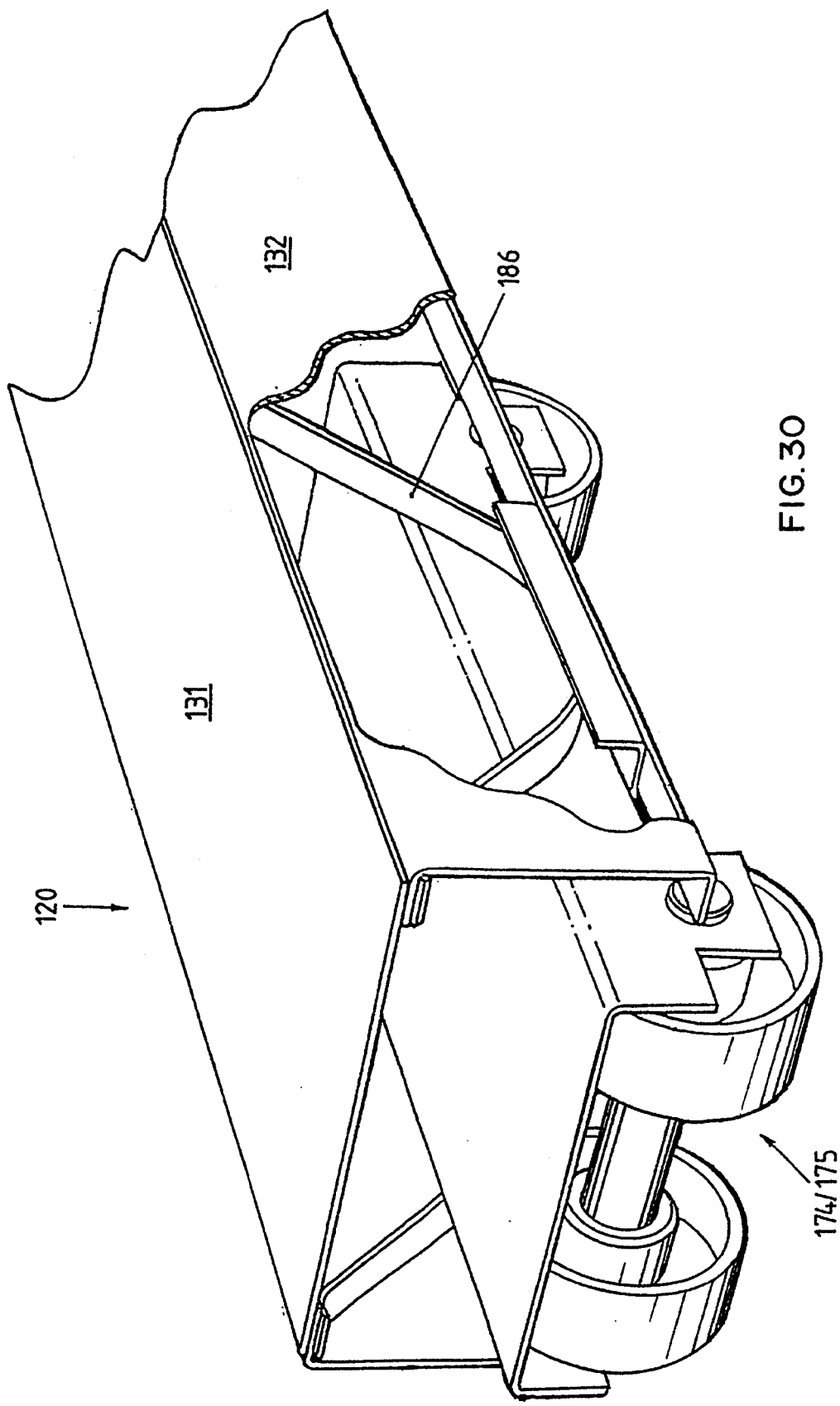
FIG. 30 shows a part cut-away view of a load finger at an end bogie location, corresponding to that of FIG. 23.

FIGS. 27A through 27C show the principles of a steering, guidance of alignment facility for the load fingers 280—and in particular the 'load' fingers for a given direction of (linear translational) movement—and which may thus become the trailing ends when the drive is reversed.

Firstly, with the load fingers 280 initially guided by running upon the guideways 249, some degree of restraint is imposed upon a line of couple load fingers 280, but this is progressively lost as the fingers leave the guideways 249—either upon entering the load stack 250 or upon depositing the load stack at a remote loading location (i.e. on the opposite side of the load deck 220).

Accordingly, some means of maintaining the integrity of the load finger running line, and to make minor adjustments in load movement is desirable, particularly if the load is to be placed in a confined load capacity space, such as a container, where there is minimal marginal space between the load of a fully loaded container and the inside container walls, with minimal intrusion by the load fingers in the residual vertical clearance between load and container roof.

FIG. 27A shows a coupling 310 between successive load fingers 280 (the end of only one of which is shown). This replaces the normal resilient flat plate interconnecting link 121.

The coupling 310 incorporates a rectangular box frame 282 housing a pair of resilient bushes, each comprising deformable rubber diaphragms 286, 287 clamped into a metal mounting plate housing 283, 284 respectively and inflatable or at least tensionable selectively by air pressure, in order to provide a reaction between the mounting blocks 283, 284 and the outer frame 282, which is in turn transmitted to an end plate 281 in the frame of the load finger 280.

Thus, differential pressure between the bushes, distends the diaphragms 285, 286 differentially and the frame 282 is canted one way or another accordingly relative to the end plate 281, as depicted in FIGS. 27B and 27C.

With the next successive load finger 280 coupled to the frame 282, it will be appreciated that the canted orientation of the frame 282 will be transmitted thereto, and the two interconnected load fingers 280 assume an angular offset—which may be reversed or neutralized by the application of appropriate air pressure under a steering regulator valve, with simple 'left/right' control action.

Having established the steering principle, the dual bush configuration may be replaced with a single offset bush reacting against an opposed hinge or another multiple bush array.

It should be appreciated that the closed base or base perimeter construction of the conventional timber pallet means that the pallet handling device must approach the pallet from one side, as shown in FIG. 18.

It follows that, with an array of base perimeter style pallets only, entry of a handling device which is to run through the entire array must be from a correspondingly remotely spaced location on one side of the pallet—unless some form of rolled-up or coiled construction, such as the 'magic carpet' concept configuration of FIG. 3.

Other style pallets may be deposited direct upon the load fingers.

Thus for a 40 foot load length an initial entry from 40 foot to one side of the pallet array must be contemplated—thereby increasing the amount of space required for the load parking bay and load handling facility.

That is a duplication of load space is imposed since the pallet array cannot be formed directly upon the load finger array, otherwise the latter cannot be withdrawn subsequently—or if it is and the load abruptly deposited upon the ground, it cannot be replaced in a single loading action.

Hence the 'master pallet' concept of FIGS. 1 through 5, which allows load formation over the space occupied by the load finger array and its subsequent removal after loading back into the original space occupied by the load.

Alternatively, an open-bottom or so-called 'wing' pallet construction, such as the moulded plastics Europal style, in which a pallet base is supported upon spaced stubby legs without a peripheral bracing skirt.

Such Europallets are typically 800 mm by 1200 mm in surface area, enabling a load three pallets (at 800 mm) in width—totalling 2400 mm—for which six rows of load fingers might be employed.

Similarly, individually mobile pallets, such as 'roll cages' may be handled collectively,

I claim:

1. A load handler for transferring palletized loads between two spaced load handling locations, the load handler comprising a load deck arranged between two spaced load handling locations and having opposite longitudinal ends each arranged proximate to another one of the load handling locations; mobile load support means for penetrating collectively beneath a pre-assembled load at either one of the load handling locations and mounted for reciprocating movements between the load handling locations by traversing over said load deck, said mobile load support means comprising a plurality of individual load support carriages to form a plurality of parallel rows each formed of load support carriages intercoupled in tandem to each other, wherein said carriages are intercoupled end-to-end, as a train, with a load carriage incorporating lateral steering means, said steering means comprising a carriage coupling on one side reacting with a displaceable membrane on an opposite side; and drive means for moving said load support means from one load handling location to the other by traversing over said load deck, whereby a palletized load can be assembled at one of the load handling locations while said mobile load support means is being transferred to the other of the load handling locations.

2. A load handler as defined in claim 1, wherein the two spaced load handling locations define support surfaces that are substantially horizontal and vertically aligned, and wherein said load deck has a support surface for said mobile load support means which is substantially coextensive with the support surfaces of the spaced load handling locations, said mobile load support means being provided with transport means for transporting same over said support surfaces.

3. A load handler as defined in claim 1, wherein each load support carriage is configured as a shallow elongate finger.

4. A load handler as defined in claim 1, further comprising track means extending substantially between opposite ends of said load deck for guiding the movements of said mobile support means between the load handling locations.

5. A load handler as defined in claim 4, wherein said track means comprises at least one track, and further comprising a releasable drive coupling for said intercoupled load support carriages, whereby said carriages may move off said at least one track at either end of said track.

6. A bad handler as defined in claim 1, wherein said individual carriages incorporate a series of underslung bogies with runners, at least one of said bogies including mounting means such that said at least one bogey is mounted to one of said individual carriages, for vertical movement, independently of said individual carriage, to ride over obstacles.

7. A load handler as defined in claim 1, wherein said load deck is mobile and movable to the spaced load handling locations.

8. A load handler as defined in claim 1, further comprising height adjusting means for elevating and lowering individual carriages.

9. A load handler as defined in claim 8, wherein said height adjusting means comprises an individual inflatable fluid bag associated with each carriage.

10. A load handler as defined in claim 3, comprising a movable, self-contained load deck support beam incorporating drive means for moving an array of load fingers mounted thereon.

11. A load handler for transferring palletized loads between two spaced load handling locations, the load handler comprising a load deck arranged between two spaced load handling locations and having opposite longitudinal ends each arranged proximate to another one of the load handling locations; mobile load support means for penetrating collectively beneath a pre-assembled load at either one of the load handling locations and mounted for reciprocating movements between the load handling locations by traversing over said load deck, said mobile load support means comprising a plurality of individual load support carriages to form a plurality of parallel rows each formed of load support carriages intercoupled in tandem to each other, each load support carriage incorporating a set of carriage bogies at each end, said bogies being mounted for riding over obstacles encountered in a loading movement path and resiliently biassed away from a carriage frame member into an extended ground engaging condition, a plurality of intermediate bogies between said end bogies, said intermediate bogies being biassed into a retracted position nesting within a carriage frame, each load support carriage further including load elevating means being operative against the retraction bias of said intermediate bogies and towards an extended position of said intermediate bogies away from the carriage frame; and drive means for moving said load support means from one load handling location to the other by traversing over said load deck, whereby a palletized load can be assembled at one of the load handling locations while said mobile load support means is being transferred to the other of the load handling locations.

12. A load handler as defined in claim 11, wherein a master load support surface is provided for depositing load constituents thereon.

13. A load handler as defined in claim 11, wherein four of said parallel rows are provided each including six of said load support carriages coupled in tandem.

* * * * *